(12) United States Patent
Soltanaghaei et al.

(10) Patent No.: US 12,366,649 B2
(45) Date of Patent: Jul. 22, 2025

(54) METHODS, SYSTEMS, AND LOW POWER RETRO-DIRECTIVE RF TAGS FOR LOCALIZATION

(71) Applicant: Carnegie Mellon University, Pittsburgh, PA (US)

(72) Inventors: Elahe Soltanaghaei, Pittsburgh, PA (US); Anthony Rowe, Pittsburgh, PA (US); Swarun Kumar, Pittsburgh, PA (US); Akarsh Prabhakara, Pittsburgh, PA (US); Artur Balanuta, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 564 days.

(21) Appl. No.: 17/591,137

(22) Filed: Feb. 2, 2022

(65) Prior Publication Data
US 2022/0244374 A1     Aug. 4, 2022

Related U.S. Application Data

(60) Provisional application No. 63/304,413, filed on Jan. 28, 2022, provisional application No. 63/144,525, filed on Feb. 2, 2021.

(51) Int. Cl.
*G01S 13/82*     (2006.01)
*G01S 7/35*     (2006.01)
(Continued)

(52) U.S. Cl.
CPC .............. *G01S 13/82* (2013.01); *G01S 7/356* (2021.05); *G01S 13/75* (2013.01);
(Continued)

(58) Field of Classification Search
CPC ........ G01S 13/75; G01S 13/751; G01S 13/82; G01S 7/356; G01S 13/931; H01Q 21/0006; H01Q 21/08
See application file for complete search history.

(56) References Cited

U.S. PATENT DOCUMENTS

2018/0275246 A1*   9/2018   Ma ..................... G01S 13/765
2019/0378356 A1*   12/2019   Fang .................. G07C 5/008
(Continued)

OTHER PUBLICATIONS

Sinc function—Wikipedia NPL .pdf (Year: 2018).*
(Continued)

*Primary Examiner* — Vladimir Magloire
*Assistant Examiner* — Nazra Nur Waheed
(74) *Attorney, Agent, or Firm* — Stanek Lemon Crouse & Meek, PA

(57) ABSTRACT

A method of operating a frequency modulated continuous-wave radar can include transmitting CHIRP signals from a plurality of antennas of the frequency modulated continuous-wave radar, receiving, via the plurality of antennas, signals including asynchronously modulated retro-directive signals from at least one remote radio frequency tag generated responsive to the CHIRP signals, generating difference Intermediate Frequency signals from the CHIRP signals transmitted and the signals received, and performing a first transform operation on the difference Intermediate Frequency signals to detect occurrence of the asynchronously modulated retro-directive signals in the difference Intermediate Frequency signals.

11 Claims, 17 Drawing Sheets

(51) Int. Cl.
  *G01S 13/75*   (2006.01)
  *H01Q 21/00*   (2006.01)
  *H01Q 21/08*   (2006.01)
  *G01S 13/931*  (2020.01)

(52) U.S. Cl.
  CPC ......... *H01Q 21/0006* (2013.01); *H01Q 21/08* (2013.01); *G01S 13/931* (2013.01)

(56) References Cited

U.S. PATENT DOCUMENTS

2020/0025865 A1* 1/2020 Gulati ............... G01S 13/42
2022/0114363 A1* 4/2022 Feng ................ G06V 20/00

OTHER PUBLICATIONS

Azzouzi, Salah et al., "New Measurement Results for the Localization of UHF RFID Transponders Using an Angle of Arrival (AoA) Approach", 2011 IEEE International Conference on RFID, 7 pages.

Decarli, Nicolo et al., "Passive UWB RFID for Tag Localization: Architectures and Design", IEEE Sensors Journal, vol. 16, No. 5, Mar. 1, 2016, 13 pages.

Galisteo, Ander et al., "Two to Tango: Hybrid Light and Backscatter Networks for Next Billion Devices", MobiSys '20, Jun. 15-19, 2020, Toronto, ON, Canada, 14 pages.

Guidi, Francesco et al., "Analysis of UWB Tag Backscattering and Its Impact on the Detection Coverage", IEEE Transactions on Antennas and Propagation, vol. 62, No. 8, Aug. 2014, 12 pages.

Guidi Francesco et al., "Passive Millimeter-Wave RFID using Backscattered Signals", IEEE Global Workshops, Dec. 2016, 6 pages.

Guidi, Francesco et al., "Millimeter-Wave Beamsteering for Passive RFID Tag Localization", IEEE Journal of Radio Frequency Identification, vol. 2, No. 1, Mar. 2018, 6 pages.

* cited by examiner

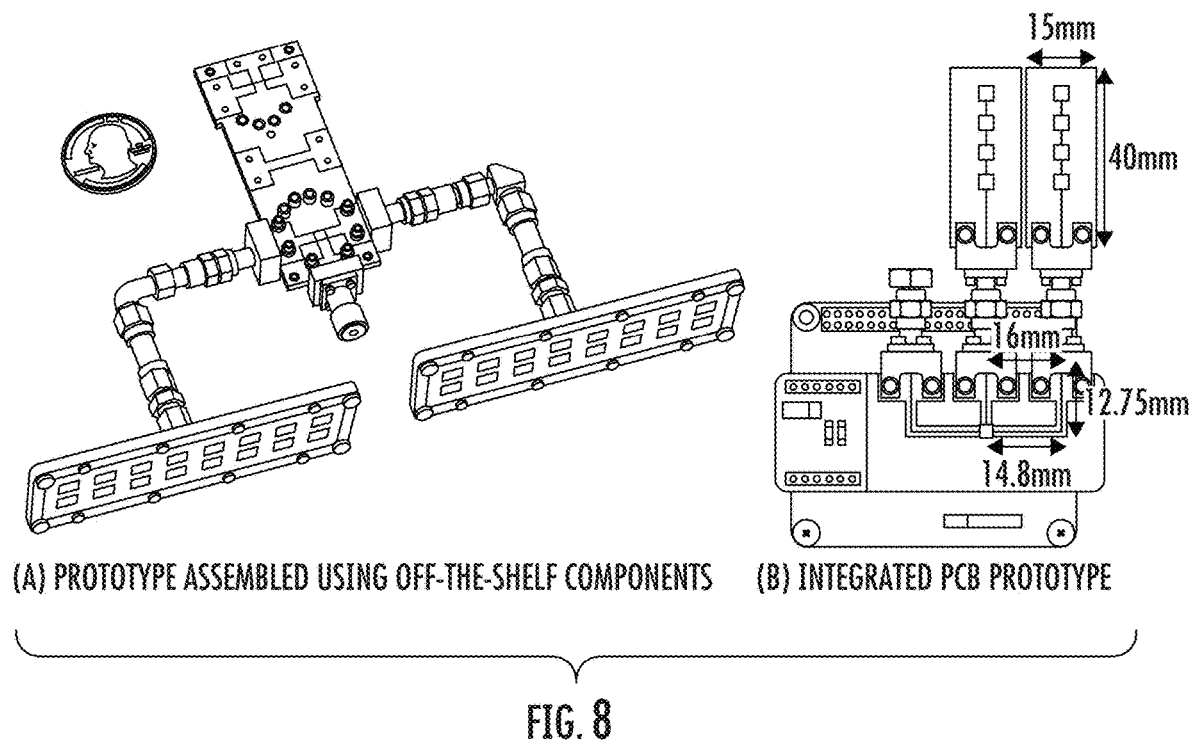
(A) PROTOTYPE ASSEMBLED USING OFF-THE-SHELF COMPONENTS
(B) INTEGRATED PCB PROTOTYPE
FIG. 8
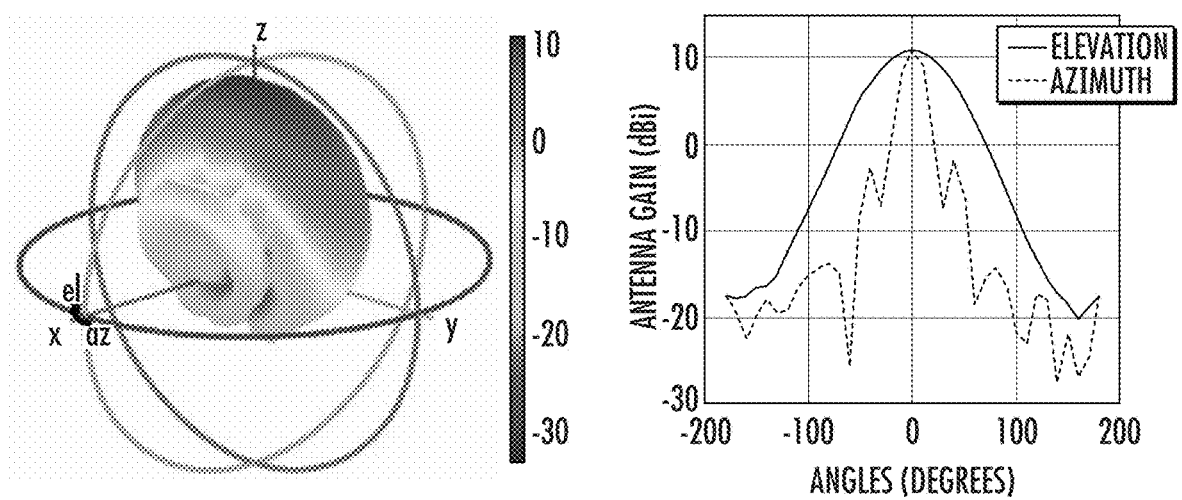
FIG. 9A
FIG. 9B

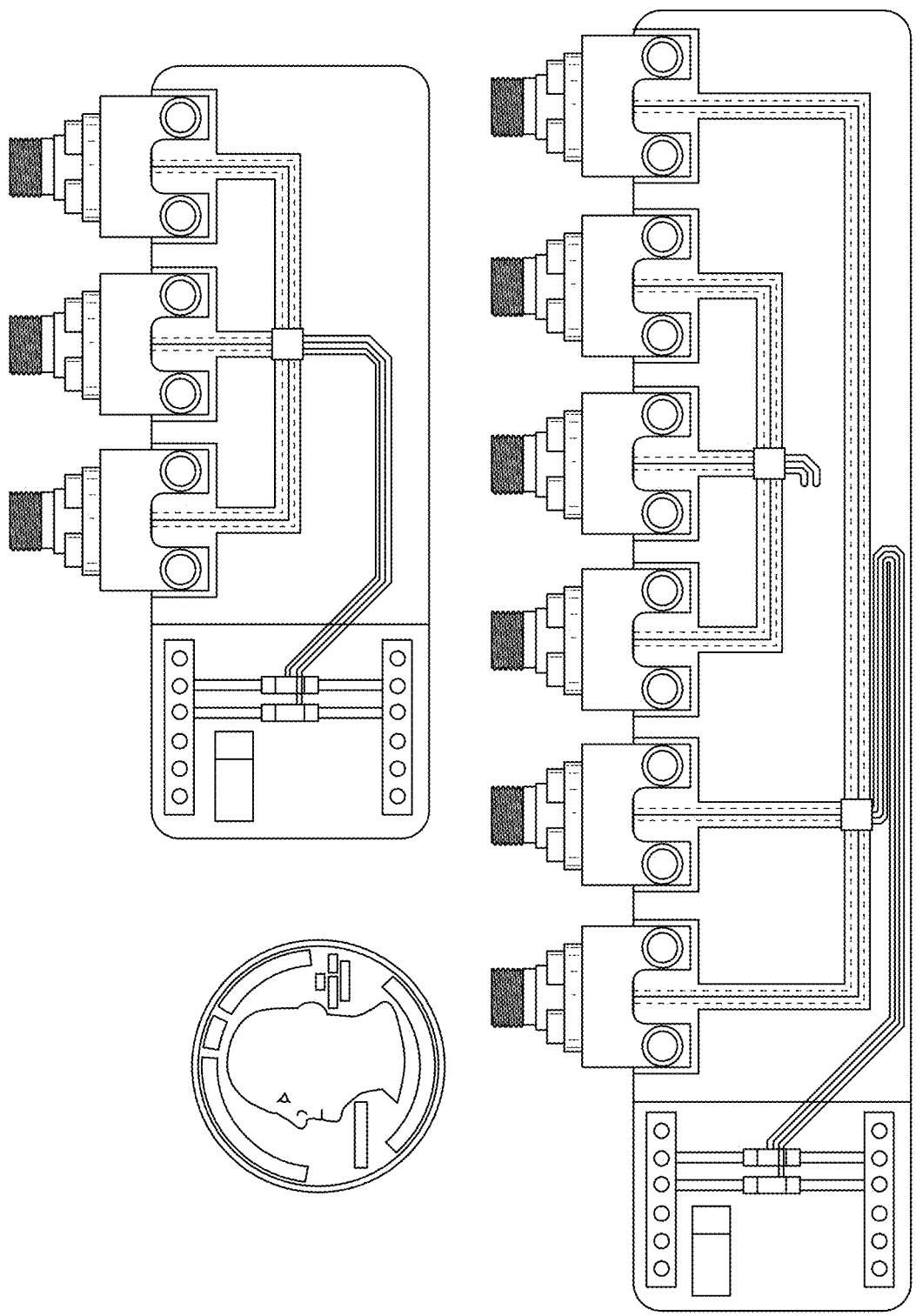

METHODS, SYSTEMS, AND LOW POWER RETRO-DIRECTIVE RF TAGS FOR LOCALIZATION

CLAIM FOR PRIORITY

The present application claims priority to U.S. Provisional Application Ser. No. 63/144,525, titled mmWave Retro-Reflective Tags for Accurate, Long Range Localization, filed in the U.S.P.T.O. on Feb. 2, 2021, and claims priority to U.S. Provisional Application Ser. No. 63/304,413, titled Long-Range Accurate Ranging of Millimeter-wave Retro-Reflective Tags in High Mobility, filed in the U.S.P.T.O. on Jan. 28, 2022 the entire disclosures of which are hereby incorporated herein by reference.

STATEMENT OF GOVERNMENT SUPPORT

This invention was made with government funds under Grant No. HR0011-18-3-0004 from the Department of Defense Advanced Research Projects Agency. The government has certain rights in the invention.

FIELD

The present invention relates to the field of electronics in general, and more particularly, to wireless communications.

BACKGROUND

Current autonomous driving technology relies primarily on both visual sensing systems (e.g. cameras, LIDARs) and visual road-side infrastructure, (e.g. visual road signs, painted markers, reflective makers). Such systems are vulnerable to obstructions such as dirt or debris and weather events such as rain and fog.

Wireless localization systems offer a natural alternative given their resilience to obstructions and inclement weather. Yet, current RF-based tag localization solutions strike a trade-off between device power consumption and range. Some solutions such as GPS, WiFi and UWB are high-power and would require frequent battery replacement of roadside infrastructure. Other solutions based on RF backscatter such as RFIDs can be lower power yet have limited range (around 5-10 meters). While recent backscatter advances have sought to improve the range of these tags, those systems may use frequency-hopping or measurements over an extended time that are ill-suited to low latency requirements of the autonomous vehicle context.

Backscatter allows ultra low-power tags to communicate by simply modulating on top of an ongoing radio signal. One of the most promising applications of backscatter technology is the ability to accurately locate these low-power tags. However, current backscatter localization systems, such as RFID, can only be detected over short ranges (<10 m). More recent efforts to boost the range of low-power tags through novel hardware design either sacrifice localization accuracy in favor of range or face regulatory hurdles outdoors. Indeed, boosting the range of backscatter localization opens up applications in fields such as autonomous driving, large scale industrial IoT, or augmented reality, where the tag and reader are often separated by large distances.

SUMMARY

Embodiments according to the present invention can provide methods, systems, and low power retro-directive rf tags for localization. Pursuant to these embodiments, a method of operating a frequency modulated continuous-wave radar can include transmitting CHIRP signals from a plurality of antennas of the frequency modulated continuous-wave radar, receiving, via the plurality of antennas, signals including asynchronously modulated retro-directive signals from at least one remote radio frequency tag generated responsive to the CHIRP signals, generating difference Intermediate Frequency signals from the CHIRP signals transmitted and the signals received, and performing a first transform operation on the difference Intermediate Frequency signals to detect occurrence of the asynchronously modulated retro-directive signals in the difference Intermediate Frequency signals.

BRIEF DESCRIPTION OF THE DRAWINGS

FIG. 8 illustrates multiple prototypes of the retroreflective tag using an ADRF5027 RF switch for evaluation in some embodiments according to the invention.

FIGS. 9(a)-(c) shows antenna beam patterns and S11 parameters for the prototype of FIG. 8.

FIGS. 10(a)-(c) illustrate a prototypes of the retroreflective tag using an ADRF5027 RF switch and associated phase and gain characteristics in some embodiments according to the invention.

DETAILED DESCRIPTION OF EMBODIMENTS ACCORDING TO THE INVENTION

Exemplary embodiments of the present disclosure are described in detail with reference to the accompanying drawings. The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

Figure 1:
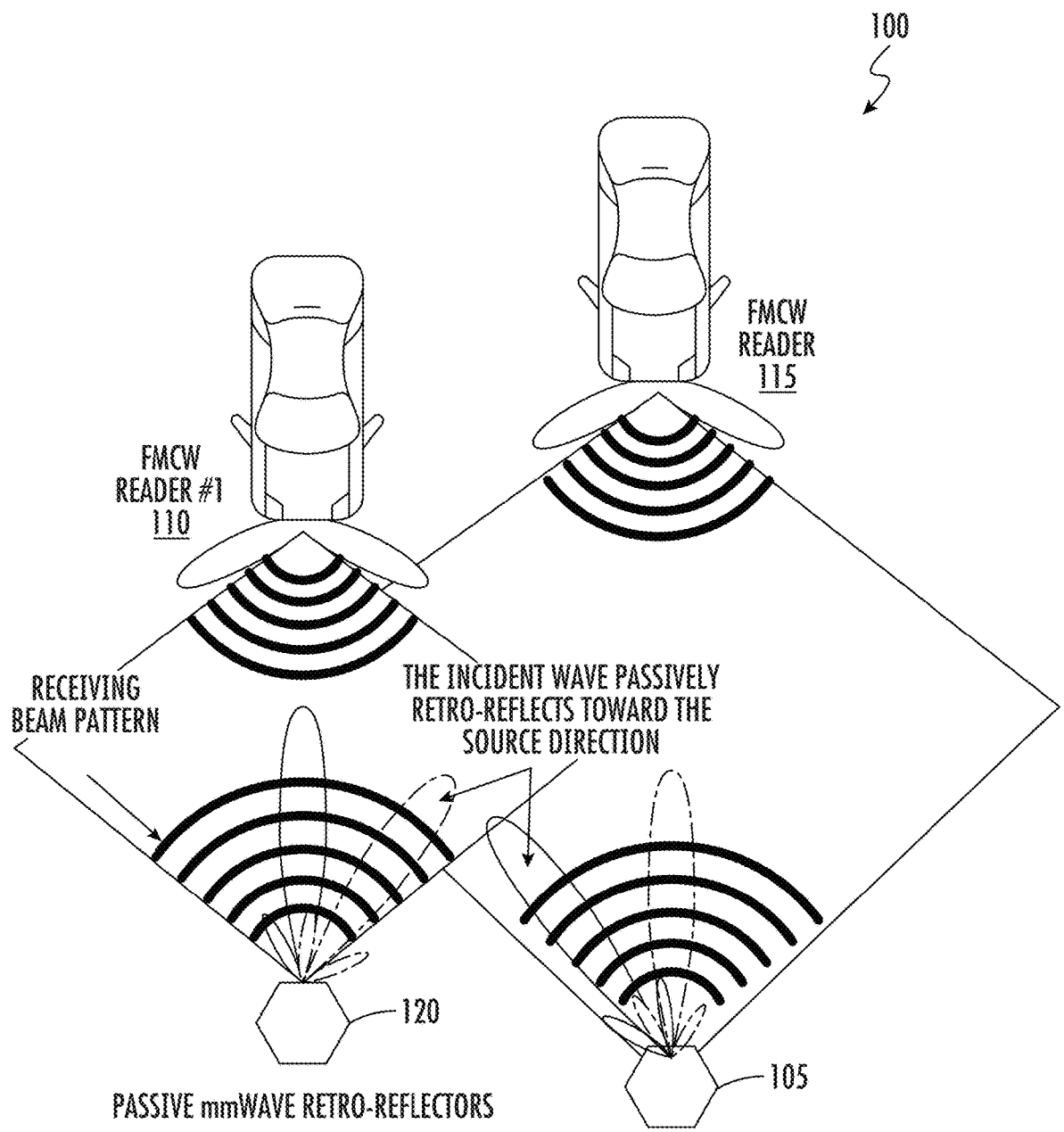
FIG. 1 is a schematic illustration of a system including an ultra-low-power mmWave retro-reflector tag that enables accurate localization at long-range by reflecting incident mmWaves signals directionally back toward a source of the mmWaves signals in some embodiments according to the invention.

As described herein, embodiments according to the invention a long-range backscatter tag can be accurately localized relative to mmWave automotive radar system 100, as shown in FIG. 1. As shown in FIG. 1, the system 100 can include radars 110 and 115, both of which can be embedded into respective vehicles, and retro-directive tags 105 and 120 located within the local environment of the system 100. In operation, the radars 110 and 115 both transmit CHIRP signals, some of which may be received as incident waves by retro-directive antenna arrays included in one or both of the tags 105 and 120. The tags 105 and 120 both retro-directively reflect asynchronously modulated versions of the incident signals back in the direction from which the incident signal was received. The retro-directive asynchronously modulated signals can be received by one or both of the radars 110 and 115 (regardless of which tag 105 or 120 transmitted the retro-directive asynchronously modulated signal.

In some embodiments according to the present invention, a mmWave retro-directive tag can achieve long range localization despite the severe path loss normally associated with mmWave band operations. In addition, in some embodiments according to the present invention, a mmWave tag can operate at ultra-low-power (e.g., <3 µW) and allow the use of a super resolution technique at the reader to enable more accurate localization. As described herein, some embodiments according to the present invention demonstrate how, despite operating at mmWave frequencies, localization can be achieved at a range greater than 100 meters while delivering about 1 centimeter accuracy indoors and outdoors, which may be applicable to applications such as autonomous driving, and robotics.

Figure 2:
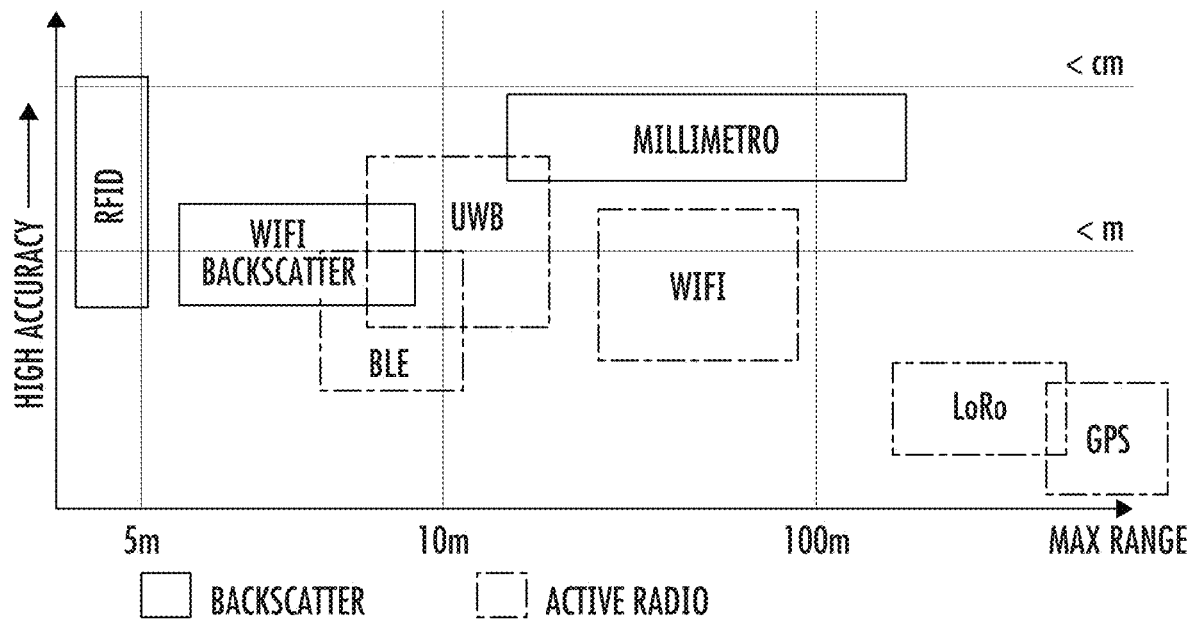
FIG. 2 is graph illustrating the relative ranges of different backscatter systems including mmWave retro-directive systems in some embodiments according to the invention.

FIG. 2 demonstrates the accuracy that may be provided by embodiments according to the present invention (referred to here as "Millimetro") relative to other localization systems. Accordingly, embodiments according to the present invention can provide retro-directive RF tags that can mitigate SNR loss that is typically associated with mmWave signals that can experience much higher path loss compared to sub-GHz frequencies, while working with a small form-factor tag with a poor Radar Cross Section (RCS). Embodiments according to the invention can provide a passive tag that uses a retro-directive antenna array, such as a Van Atta array. RF retro-directive can operate in harsh environments, varying lighting and many weather conditions. Van Atta arrays can be completely passive and reflect a signal arriving at the array in any direction, back toward the same direction from which the signal came. This retro-directivity can provide the desired signal gain, can provide for mobility and can reduce interference while keeping the tag passive.

In still further embodiments according to the present invention, the retro-directive RF tags can operate asynchronously relative to the tag-reader (i.e., radar). For example, as appreciated by the present inventors, one of the challenges in operating a tag localization system for a mobile application, such as autonomous vehicles, or at large scale (such as industrial IoT), is the ability to quickly and accurately localize the tags when a large number of radars are operating simultaneously in the same area. To address this, embodiments according to the present invention can use a tag-reader architecture wherein the tag reader and the tag operate asynchronously relative to one another, whereas RFID tag-reader architectures, for example, may use a medium access protocol that provides a message protocol, for example, to synchronize the tags and the readers to allow multiple tags and readers to communicate with one another without creating collisions during communication.

In contrast, the retro-directive antenna arrays on the tags in some embodiments can allow for each reader to simultaneously receive its own distinct reflection of a transmitted signal, allowing for multiple readers to co-exist and to locate tags without impact on latency. Accordingly, embodiments according to the invention may piggy-back on the ability of mmWave radars to detect and locate multiple targets simultaneously while avoiding interference with other nearby radars. Furthermore, in some embodiments the circuitry in the tag can be simplified to enable ultra-low power consumption.

In still other embodiments according to the invention, the tag can operate a time-invariant modulation scheme for the signals that are retro-directed by the antennas arrays which can allow the user of radar processing techniques to detect the modulated reflected signal as a signature of the tag and then accurately localize the tags using a super-resolution technique, in some embodiments according to the invention.

As further appreciated by the present inventors, while the asynchronous tag-reader architecture can provide low latency, it may complicate tag identification and localization as the radar has no information regarding the tag operation status during scanning. This may be even more challenging in multipath-rich environments such as an in an urban setting or cluttered industrial spaces, in which the received signal may be significantly dominated by static multipath reflections.

Accordingly, in some embodiments, the asynchronous modulation used by the tags can provide a code so that the readers can distinguish tags from one another which may also avoid nearby tags interfering with one another. This architecture may also allow the number of tags and readers to be scaled up with minimal impact on the latency to detect and localize tags, as the tags can communicate independently and simultaneously without coordination with other tags or the readers.

In some embodiments according to the present invention, a tag-reader system may be built using conventional mmWave radars operating at, for example, 24 GHz with 250 MHz of bandwidth. In some embodiments according to the present invention, a tag-reader system may be built using conventional mmWave radars operating with 77 GHz radar. In some embodiments according to the present invention, a tag-reader system may be built using conventional mmWave radars to operate with a tag according to embodiments of the invention, which may operate at 24 GHz including, for example, a Van Atta array and ultra-low power circuitry for modulating the retro-directive signals transmitted back to each radar.

As described herein, systems according to the present invention were evaluated in indoor and outdoor settings, which shows median accuracy of 15 centimeter localization over range of 100 meters. Systems according to the present invention were evaluated to incurs a power consumption of 2.36 µW with continuous tag modulation at the frequency of 300 Hz, while powered by a 3V CR2032 lithium coin cell which is comparable to the internal discharge rate of most batteries (25.6 years of life given CR2032 capacity). In operation, this system was evaluated to uniquely identify multiple uncoordinated tags from multiple uncoordinated readers in the same RF collision domain.

Figure 3:
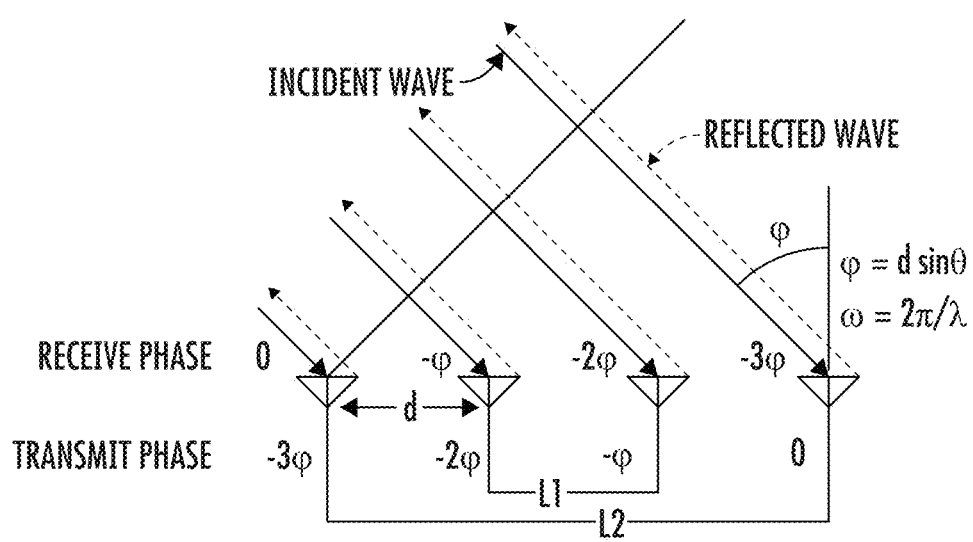
FIG. 3 is a schematic illustration of a Van Atta retro-directive array of antennas configured to reflect incident waves directionally back toward a source.

As appreciated by the present inventors, retro-directivity can provide the capability to use analog RF components in the tag to reflect an incident signal towards the source direction without any prior knowledge of the signal's direction of arrival at the antenna. One type of retro-directive array is a Van Atta array 300, as shown in FIG. 3. According to FIG. 3, the Van Atta array 300 can include of an array of antennas that are connected in symmetrical pairs by transmission lines of equal length or length differences equal to multiples of the guided wavelength. In other words, the transmission lines do not contribute additional phase difference to incident waves. Every antenna in the Van Atta array 300 serves as both receiving and transmitting antennas. The signal received by each antenna is transmitted through the associated transmission line and re-radiates from the corresponding paired antennas.

As further shown in FIG. 3 that every antenna and its pair are arranged in a mirror symmetric manner (i.e., the first antenna is connected to the last, the second to the penultimate, etc.). This arrangement of the antennas causes a relative phase reversal for the reflected wave when compared to the incident wave. The result is that all energy incident to the Van Atta array 300 is reflected back along the direction of incidence. As appreciated by the present inventors, the Van Atta array 300 can be designed completely using passive components, which makes it well-suited for low-power backscatter.

To understand the retro-directivity of passive Van Atta arrays, let us consider an N-element array 300 as shown in FIG. 3. Consider a signal received at an angle θ, a relative phase shift of $[0, -\varphi, -2\varphi, \ldots, -(N-1)\varphi]$ across the antennas are expected, where $\varphi=2\pi d \sin \theta/\lambda g$, and d is inter-elements pacing and $\lambda g$ is the guided wavelength of the signal. The received signal by m antenna (m=1, . . . , M) travels through a transmission line of length lm, to re-radiate out from the corresponding paired antenna (N−m+1), resulting an extra phase shift of $2\pi lm/\lambda g$, as shown in FIG. 3. Since the connecting transmission lines in between are designed to have equal lengths lm (or differ by multiples of wavelengths), the phase shifts due to all these lines are effectively equal. As a result, the signals radiating out from the array will have a reversed phase distribution of $[-(N-1)\varphi, -(N-2)\varphi, \ldots, -2\varphi, -1\varphi, 0]$ compared to the incident signals. As appreciated by the present inventors, this aspect can be used to leverage the Van Atta array to increase the received signal strength by ensuring that it is focused specifically along the direction of the reader (i.e., the direction that the incident signal arrived from), thus increasing the operating range of a system utilizing this aspect.

As appreciated by the present inventors, accurate ranging and therefore localization, can require high bandwidth for high temporal resolution. However, wide ISM radio bands (i.e., portions of the radio spectrum reserved internationally for industrial, scientific and medical purposes, excluding applications in telecommunications) are not available in lower frequencies. Accordingly, embodiments according to the present invention leverage the large, contiguous multi-GHz unlicensed bandwidth in mmWave frequency bands. As further appreciated by the present inventors, the short wavelength of the signal in these frequencies enables the implementation of large antenna arrays in a small form-factor. This can significantly improve the performance of Van Atta retrodirective arrays as it allows to improve the signals and radar cross section of the backscatter device without losing the angular aperture.

As such, embodiments according to the present invention including the combination of a retro-directive array and the mmWave operating frequency can enable long range and low power (resulting from a Van Atta array) as well as accurate localization and compact form factor (resulting from the use of mmWave frequencies). While free-space path-loss for mmWave frequency bands can be greater than in lower frequencies, the mmWave frequency bands also provide stronger reflections from tags in the backscatter context which can balance against the free-space path-loss issue. Moreover, described herein, the free-space path-loss issue is also addressed through the use of a retro-directive array (such as a Van Atta array).

Accordingly, in some embodiments according to the present invention, a localization system can include mmWave retro-directive arrays operating with frequency modulated continuous-wave (FMCW) radars to enable long range and accurate backscatter localization.

Figure 4:
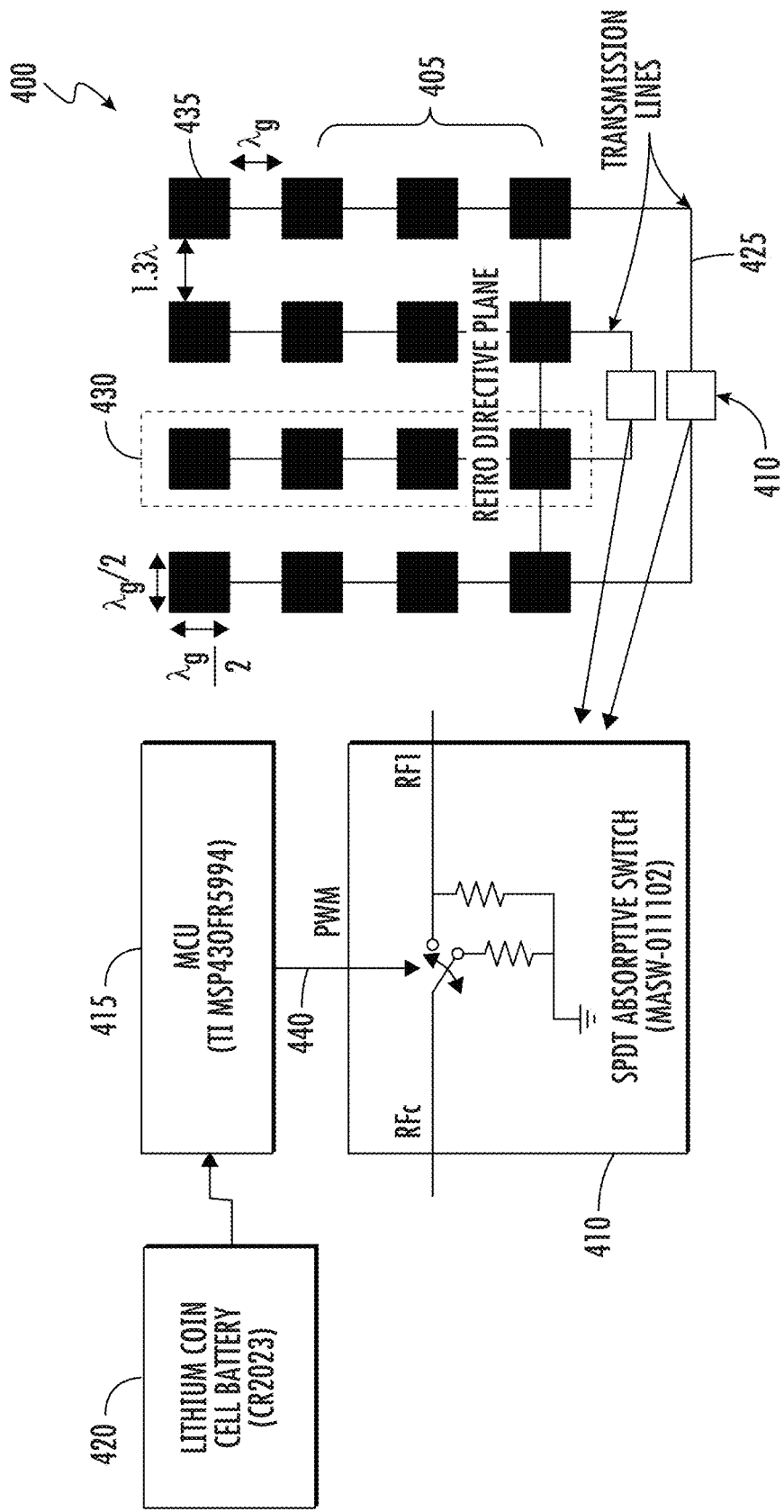
FIG. 4 is a schematic illustration of a mmWave retro-directive tag including a retro-directive antenna array with RF switches coupling pairs of the antennas together through transmission line segments responsive to a modulation signal that is asynchronous relative to the mmWave signals received at the retro-directive antenna array from a source of the mmWave signals in some embodiments according to the invention.

FIG. 4 is a schematic illustration of a mmWave retro-directive tag 400 including a retro-directive antenna array 405 with RF switches 410 coupling pairs of the antennas 430 together through transmission line segments 425 responsive to a modulation signal 440 that is asynchronous relative to the mmWave signals received at the retro-directive antenna array 405 from a source of the mmWave signals in some embodiments according to the invention.

As shown in the RF switches 410 are placed inline with the transmission lines thereby separating the lines into segments 425 which connect the antennas 430 in mirror-symmetrical pairs. The RF switches 410 operate responsive to the modulation signal 440 to couple/decouple the antennas 430 in each pair coupled to the RF switch into one of two states.

In operation, the modulation signal 440 controls the switches 410 to couple the antennas 430 together when the switch 410 is on to create retro-reflection and to decouple the antennas 430 from one another to terminate the antennas to a load to break retro-directivity in the off state. In particular, at each impedance state, the tag presents a certain radar cross section (RCS) and maximizes the differential RCS of the two states allows greater ease in tag detection and identification. For a fixed effective aperture, higher frequency operation offers significant gain in backscatter signal detectability.

Figure 10B:
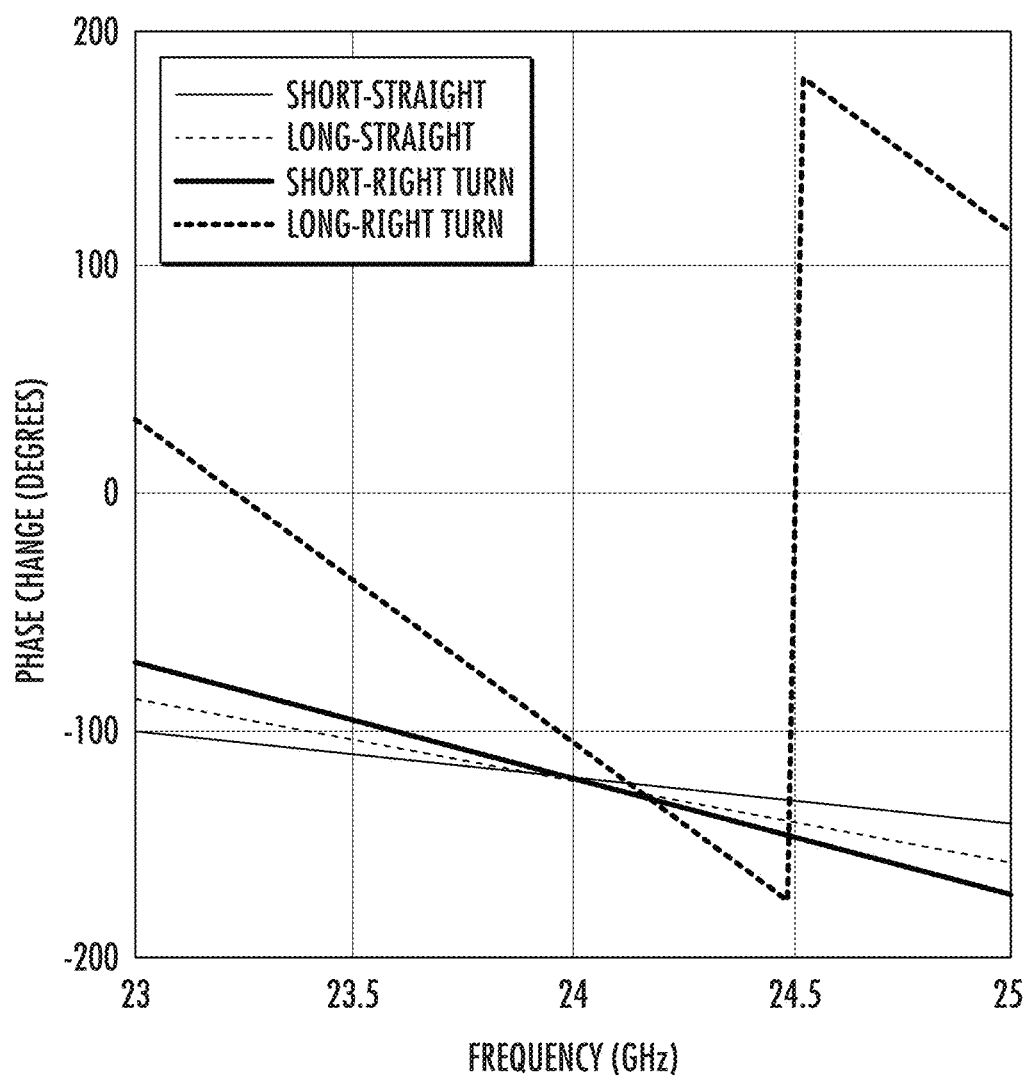

As further shown in FIG. 4, the array 405 can include 4 vertical antennas 430 in a linear Van Atta arrangement with each antenna 430 being as a 4-element linear series-fed patch array 435 for extra gain. This allows a large beam width along the plane of retro directivity while compensating the beamwidth in the orthogonal plane to increase the overall antenna gain. In addition, the series fed patch array elements with high gain allows maximization of RCS with the minimum number of components for modulation. The patches on every Van Atta element are followed by a quarter wave transformer to provide high S11 characteristics. The induced phase delays of each feedline network relative to other lines (from 1 to N, relative to 2 to N−1, etc.) are configured to be identical or near identical by choosing the line length to be proportional to the wavelength. However, can become more challenging when inserting a switch 410 in the middle of each transmission line. To address this, each line can be separated into the two segments 425 from each antenna to the switch and tune the length of each line segment such that the phase shift across corresponding parts of antenna pairs encounter similar phase shifts in the center frequency (shown in FIG. 10b). In some embodiments according to the invention the RF switches 410 can be a GaAs absorptive Single Pole Double Throw (SPDT).

In some embodiments according to the invention, the modulation signal 440 can be asynchronous relative to the operation of the radar that transmits the signals received by the tag 400. As used herein, the term "asynchronously" includes operations where the modulation signal 440 operates even in the absence of any signal from a radar or reader, or operates in the absence of a handshake protocol in cooperation with a radar or reader. In some embodiments, the modulation signal 440 can be generated by a low-power processor circuit which operates independently of the radar in that the processor circuit does not implement a handshake protocol with the radar to "wake-up" the tag 400 before detection and localization can be performed. In some embodiments, the modulation signal 440 can be generated by an oscillator circuit or other electronic device. In some embodiments, the modulation signal 440 can be generated by a circuit that is powered by the battery circuit 420 even in the absence of any signal from the radar.

Figure 5:
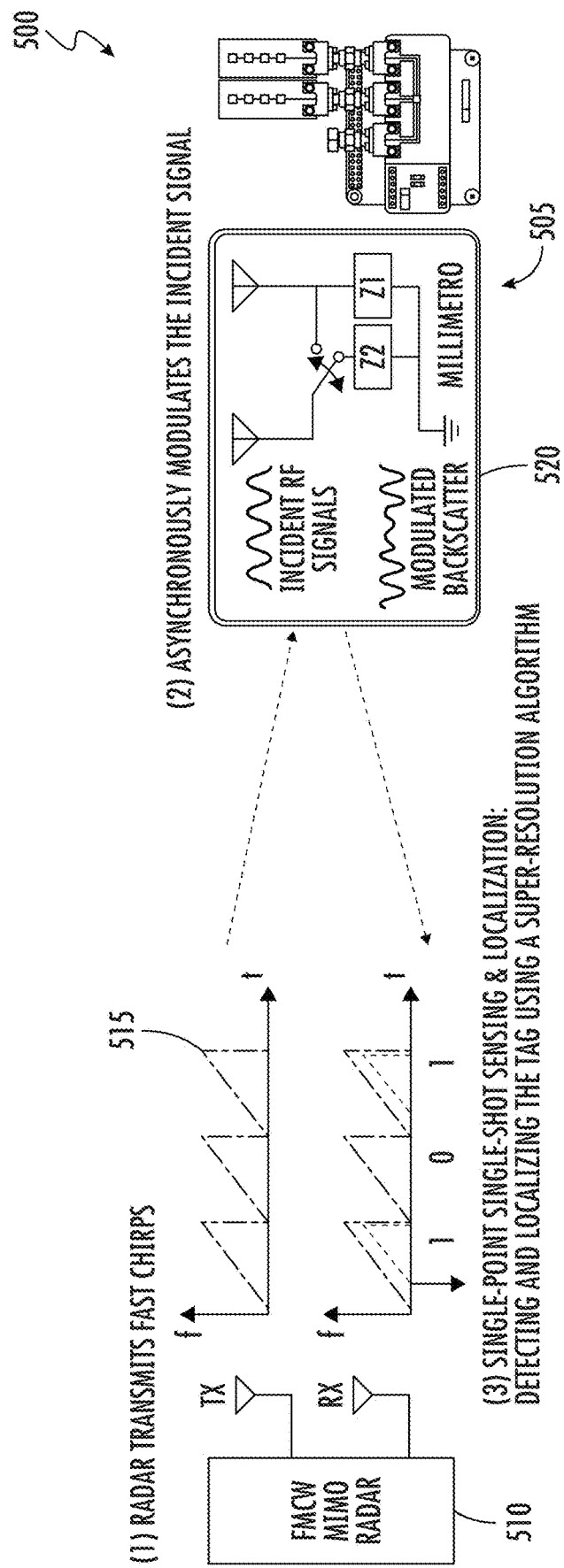
FIG. 5 is a schematic illustration of a mmWave retro-directive localization system including the tag of FIG. 3 configured to receive mmWave CHIRP signals from an FMCW radar source and to reflect asynchronously modulated signals retro-directively back to the FMCW radar source for identification and localization of the tag using the asynchronously modulated retro-directive signals in some embodiments according to the invention.

FIG. 5 is a schematic illustration of a mmWave retro-directive localization system 500 including a tag 505 of FIG. 4 configured to receive mmWave CHIRP signals 515 from an FMCW radar source 510 (sometimes referred to herein as "radar") to reflect asynchronously modulated signals 520 retro-directively back to the FMCW radar source 510 for identification and localization of the tag 505 using the asynchronously modulated retro-directive signals 520 in some embodiments according to the invention. In operation the tag 505 continuously modulates any incident signal, for retro-directive transmission back to the radar 515 in the direction that the incident signal arrived. The asynchronously modulated retro-directive signals 520 are received by the radar 510 then identified and localized by the FMCW MIMO radar.

In particular, the radar transmits fast chirp signals 515 (in the or-der of μs), each occupying the entire ISM band available in mmWave frequency range (e.g. 250 MHz bandwidth in 24 GHz). The fast chirp signals 515 are received by the tag 505, which then transmits the asynchronously modulated signals 520 retro-directively back to the radar 510. The radar 510 analyzes the asynchronously modulated signals 520 to identify those signals as being from the tag and then localize the tag 505.

As appreciated by the present inventors, conventional backscatter communication systems, such as RFID, use a handshake protocol between the tag and reader to wake up the tag (i.e., power the tag up) and then interrogate the tag to respond to the reader. However, such protocol relies on time-multiplexing in a multi-tag multi-reader scenario, resulting insignificant added latency. In addition, in a dynamic setup such as autonomous driving, it is more challenging for the readers to coordinate with each other in a timely manner. Accordingly, embodiments according to the present invention can leverage the retro-directivity as an opportunity for an alternative tag-reader architecture. In some embodiments according to the present invention, the energy source of the tag 505 can be independent from the backscatter localization system. In other words, the tag 505 may continuously modulating any incident signals independent from the reader operation, whether or not the incident signal was transmitted by the radar 510 or whether the tag 505 is known to the radar 510. This may simplify the tag circuitry by minimizing the need for any computational logic, envelop detector or decoding components, and therefore enabling low power operation and thereby suitable for scale deployment.

In addition, as a result of the retro-directivity properties, the tag 505 can simultaneously respond to multiple readers by minimizing potential interference, resulting in concurrent multi-tag multi-reader operation. Further, the power issues raised by the continuous operation of the tag, can be addressed by the asynchronous low power modulation method. Accordingly, embodiments of the present invention can provide low power, long range, and accurate localization) by use of ultra-low power retro-directive tags including retro-directive antenna arrays (such as Van Atta arrays) to increase the operating range of the tag without requiring complex and high power components. Combined with short wavelength of mmWave signals, the tags can include large but compact Van Atta arrays to further improve the backscatter retro directivity without reducing the angular aperture. As described herein, however, the path loss of mmWave signals (which can result in high in-band interference in multipath-rich environments) can be addressed by the retro-reflective modulation to increase the differential radar cross section of the backscatter signal, thus improving the tag detectability.

Still further, embodiments of the present invention can provide a single-source super-resolution tag localization as part of the radar to enable single point localization by estimating the range and angular properties of the retro-reflected signal. The radar 510 identifies the tags by searching for the unique signature of asynchronously modulated signals in the range-Doppler domain. Accordingly, the mmWave super-resolution technique can enable the radar to fine-tune the range and angular estimates of the tag retro-reflection and perform localization.

Millimetro leverages commercial FMCW MIMO radars to identify and locate tags. During the operation, the radar transmits multiple chirps each occupying the entire available bandwidth. In the presence of an active tag in the field of view of the radar, the incident signal at the tag gets modulated and retro-reflects toward the radar. The radar receives this signal at its antenna array and multiplies it by the trans-mitted signal, creating a difference intermediate frequency (IF) signal. The IF signal is then analyzed to identify the tag retro-reflection and extract the corresponding range and azimuth information.

One of the main challenges in detecting the tag is the asynchronous functionality of the tag and the reader. The radar has no notion of when the tag started the modulation and it is very well possible that the tag toggles in the middle of a chirp resulting in a corrupted reflected signal. In addition, in multipath-rich environments, the radar has to deal with large dynamic ranges due to other reflections in the environment such as second-order reflections from the radar to the tag and vice versa. Millimetro exploits state-of-the-art signal processing solutions to address this challenge.

Figure 6:
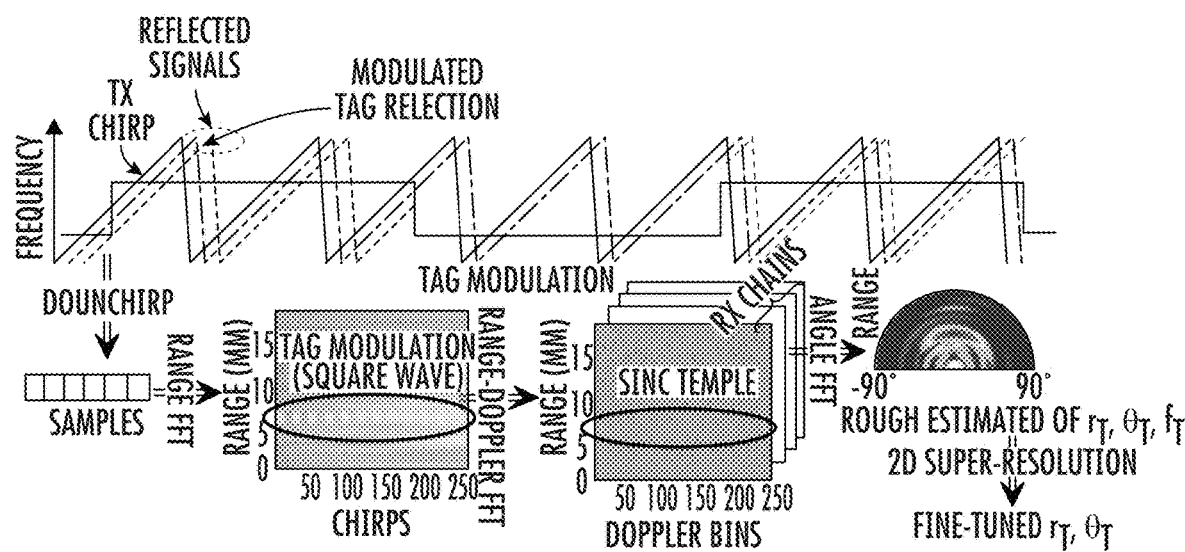
FIG. 6 is a schematic illustration of the identification and localization of the tag using the asynchronously modulated retro-directive signals received from the tag in some embodiments according to the invention.

FIG. 6 is a schematic illustration of the identification and localization of the tag performed by the radar 510 in FIG. 5 using the asynchronously modulated retro-directive signals received from the tag in some embodiments according to the invention. According to FIG. 6, the effect of the tag 400 on-off modulation can be formulated as a square wave with the frequency of switching, multiplied by the retro-reflected signal. However, the time delay of the square wave with respect to the FMCW chirps is unknown to the radar due to asynchronous operation of the tag and the reader. To address this problem, the radar performs the tag detection and localization in the frequency domain to create a time-invariant signature of tag modulation. During the operation, the radar 510 triggers $N_2$ fast chirps within a frame and records the IF signals using a sampling frequency of $F_B$. Then, a 2-dimensional Fourier transform is applied on a frame to estimate the range-FFT map of the channel. Intuitively, the FFT across chirp samples separates the reflected signals based on their distances from the radar. Therefore, the modulation square wave appears in the FFT output at the tag's corresponding range bin. A snapshot of FFT output can be seen in FIG. 6 at 7 m range bin, where an exemplary the tag was located.

However, this square wave may be dominated by strong multipath reflections in the environment that fall under the same range bin. To address this issue, the radar 510 can leverage the range-Doppler map to separate the tag reflection from static multipath reflections in the environment. The intuition is that a square wave across chirps appears as a sinc function in the range-Doppler FFT with the primary frequency component equal to the modulation frequency. The unique signature of the tag modulation in the range-Doppler map also allows us to differentiate the tag reflection from other dynamic reflections. As such, the radar 510 can identify the tag retro-reflection and the corresponding range bin by match filtering the expected sinc template $P_A(f)$ across range bins:

$$P_A(\tau)=\text{FFT}(\text{square}(2\pi f_t \tau)) \qquad (1)$$

where f switch is the tag's modulation frequency, square (·) is a periodic square function, and Ts are the chirp sampling time corresponding to radar 510 chirp repetition frequency. However, in a multipath-rich environment, the radar may receive more than one copy of the retro-reflected tag signal (i.e. a second order reflection that reached to the tag from a strong reflector in the environment) and the match filtering may result in a higher correlation for the multipath signal than the direct path between the tag and the reader. To avoid such confusions, Millimetro defines a threshold and selects the shortest range bin that passes the correlation threshold. It should be noted that the threshold defines a trade-off between localization accuracy and false alarms, which was studied and the evaluation is presented hereinbelow.

Similarly, the tag can be identified in the azimuth plane by using the phase difference between receiving antennas. The radar 510 performs the range-Doppler processing for all the receiving antennas. Each peak of the Doppler-FFT contains phase information for every reflection including the Millimetro tag. Therefore, a discrete FFT over the sequence of antennas results a range-angle map with peaks at the corresponding tag locations as shown in FIG. 6.

In mobile scenarios, the tag modulation frequency will be shifted by the Doppler frequency corresponding to the relative velocity of the tag and radar. The operations described above can be extended to mobile scenarios by refining the match filtering template to account for expected Doppler velocity as:

$$P_A(\tau)=\text{FFT}(\text{square}(2\pi f_t \tau) \times \cos(2\pi(2vf_c/c)T_c\tau)) \qquad (2)$$

where v is the relative Doppler velocity and Tc is the chirp duration. Therefore, the radar 510 defines a 2D template matrix for the corresponding tag modulation frequencies and expected Doppler velocity and selects the (ft,v) tuple with the highest correlation across range bins of the range-Doppler map.

In some embodiments the tag modulation rate is a function of radar's chirp duration and the tag power budget. On one hand, the radar 510 may need to receive a full modulation period without in-chirp corruption to detect the tag. In some embodiments, the modulation rate should be proportional to the available power budget at the tag (either using a battery or harvesting energy). Therefore, the tag modulation frequency can be defined as:

$$f_t = \frac{1}{2*(kT_c)},$$

Where Tc is the radar chirp duration and k is a constant scalar. In some embodiments, every tag switching may result in a corrupted chirp, then by selecting k>3, the radar 510 can maximize the reception of at least one full tag modulation in each frame. In some embodiments Tc is defined on the order of 150-350 us and the tag modulation period on the order of 3-10 ms. Other values may also be used.

To locate the tags in the physical space, the tag range estimate can be combined with the angular properties of the retro-reflection by leveraging the antenna array at the radar 510. The combination of range and angles allows the radar 510 to locate the tags locally from a single vantage point without requiring any sort of triangulation or trilateration. Combined with the small form factor of mmWave MIMO radars, this enables the radar 510 to be used as a portable backscatter localization system in a variety of applications such as urban sensing, industrial IoT, or augmented reality.

In some embodiments according to the present invention, the azimuth of the tag can be estimated by using the phase difference between receiving antennas of the radar 510 by performing the range-Doppler processing for all the receiving antennas. Each peak of the Doppler-FFT contains phase information for every reflection including the tag. Therefore, a discrete FFT over the sequence of antennas results a range-angle map with peaks at the corresponding target locations, shown in FIG. 6.

In further embodiments according to the invention including highly mobile scenarios, the Doppler effect may change the received signals. As appreciated by the present inventor, localization in high mobility situations may be enabled by implementing a Moving Target Indication (MTI) filter and an adaptive Kalman filter. While the asynchronous tag-reader architecture can provide low latency identification and localization, can be accurate to the cm level in lower mobility scenarios, it may be less effective in higher mobility scenarios in which the received signal includes noise artifacts and exhibits doppler effect. Therefore, fault conditions such as missing detection and false detection are more likely to occur in high mobility. For example, in higher mobility scenarios, a background object with a large RCS can cause a false detection if its Doppler frequency overlaps with the Doppler frequencies of the matched filter used for tag identification. To address this, embodiments according to the invention include processing using a MTI filter which can normalize the received signal, identify the frequency bin containing the highest total magnitude of reflections as being the velocity of the reader, and attenuate the received signals around the Doppler velocity of the reader. Because the tag's signal is constructed to appear across multiple Doppler frequencies (i.e. sinc function), this approach is robust to overlap between the signal waveform and other objects.

Figure 20A:
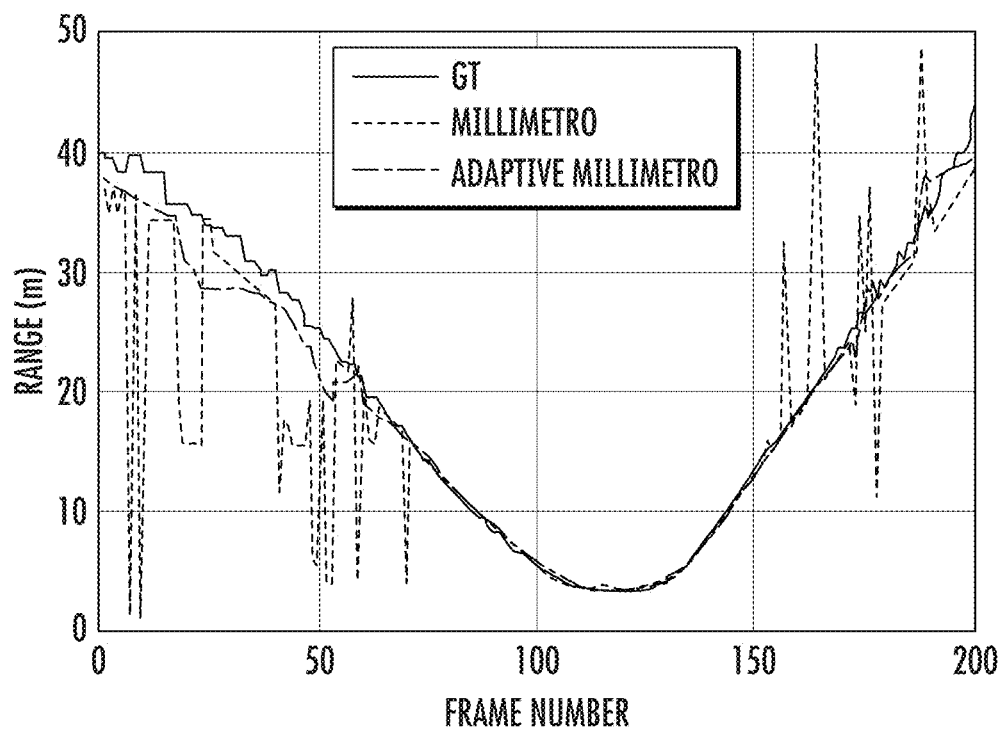
FIGS. 20(a)-(b) are graphs illustrating localization performance of an MTI and adaptive Kalman filter approach relative to other embodiments according to the invention.
Figure 20B:
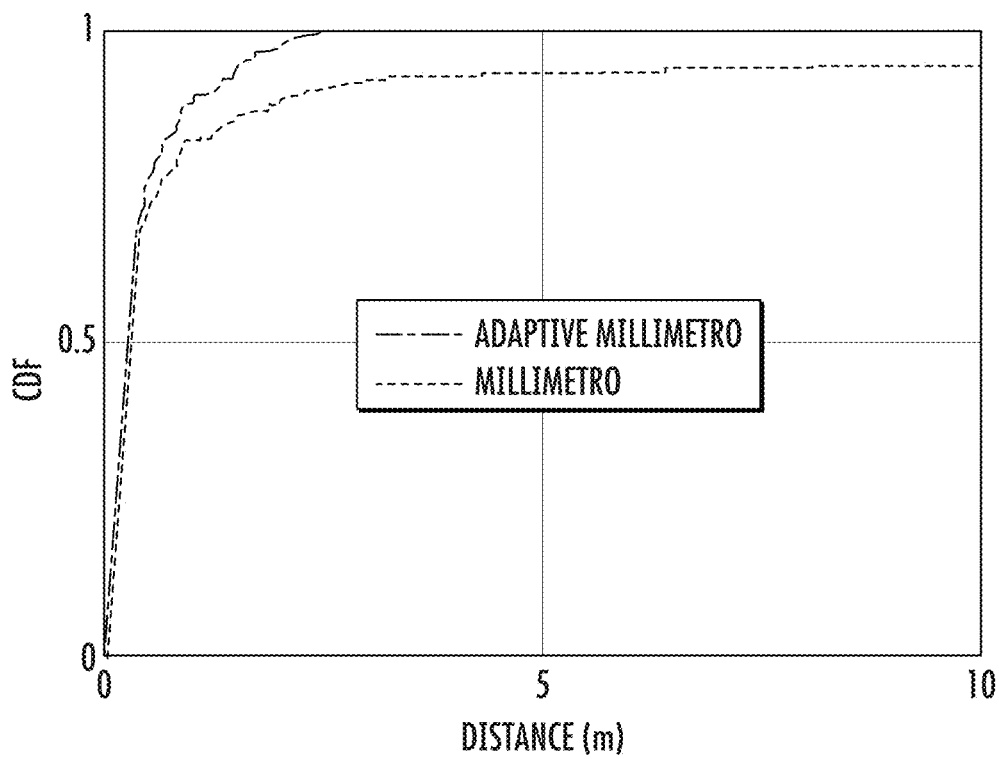

Further, high mobility cases can cause the radar fail to detect the tag because of metal obstructions or limited Doppler bandwidth. To address this, embodiments according to the present invention can also include processing using an adaptive Kalman filter to detect errors in tag localization and track tags. Using Mahalanobis distance, the measurement noise covariance matrix is tuned over time to match a dynamic, changing environment. Additionally, if a measurement differs significantly from the filter state, it is used to update the covariance but not the state estimate, allowing the tag to be tracked through detection errors as shown in FIGS. 20(*a*) and (*b*).

However, the resolution of FFT-based estimates may be limited in multipath-rich environments, wherein the FFT-based mechanism described above may be used to get an initial estimate of tag's range and azimuth angle and then refine these estimates by using a super-resolution algorithm. The sampled signal within a chirp can be written as:

$$s(n) = \sum_{p=1}^{P} \gamma_p \cos\left(2\pi S \tau_p \frac{n}{f_s}\right), n = 0 \ldots N-1 \quad (3)$$

Where N is the total number of samples in a chirp, S=B/Tc is the slope of each chirp B is the chirp bandwidth, and γp and τp are the complex amplitude and the time delay of target p. When the signal is collected by an array of antenna elements, a spatial sampling is also observed resulting on a new component in the time delay expressed as:

$$\tau_p = \frac{2}{c}(r_p + ld\sin\theta_p), l = 0 \ldots L-1 \quad (4)$$

Where rk and θk are the range and azimuth of target p, c is the speed of light, d is the inter-antenna array spacing, and L is the number of receiving antennas. Therefore, a 2D MUSIC operation as described for example in S. Xu, B. J. Kooij, and A. Yarovoy. Joint doppler and doa estimation using (ultra-)wideband FMCM signals, Signal Processing, 168:107259, 2020, can be defined for joint range-azimuth fine-tuning. The initial FFT-based estimates of the tag's range and azimuth angle also allows to limit the search space to the tag location and avoid spurious multipath estimates. The range and angular estimates can be used to directly localize the tag in the 2D physical space. In the presence of antenna arrays in the elevation plane of the radar, this formulation can be extended to a 3D joint-estimation of range, azimuth and elevation.

It will be understood that although embodiments according to the present invention are described with reference to Fourier Transforms, FFTs, etc., other types of transforms may be used to provide the detection and localization processing described herein in some embodiments according to the invention.

The asynchronous architecture of the system 500 supports both multiple tags and readers without compromising on read latency, which may be important in some applications, such as in autonomous driving. Embodiments according to the present invention can provide detection and localization algorithm such that separate multiple active tags with different modulation frequencies can be distinguished from one another.

The intuition is that different modulation rates appear as sinc function with different frequency components in the range-Doppler profile. In other words, switching at a frequency ft will result in peaks in the sinc function at 2πTcft, 2πTc3ft, 2πTc5ft, etc. To avoid collision, two different switching frequencies will peak at bins that are an integer away, that is 2πTcΔft>2πN. This condition is sufficient to ensure that none of the peaks collide with peaks of other switching frequencies. For Nc=256, up to 24 switching frequencies can be assigned such that no peak collides.

For denser deployments, the criteria can be relaxed to allow the first peak (2πTcft) to collide, and ensure that subsequent peaks (2πTc3ft, 2πTc5ft) don't collide. This changes the criteria to 2πTcΔft>2π3N, thereby allowing more switching frequencies. This way the criteria can be relaxed as more tags are deployed. For Nc=256, relaxing first peak collision gives 67 frequencies and relaxing second peak collisions gives 106 frequencies.

Figure 7:
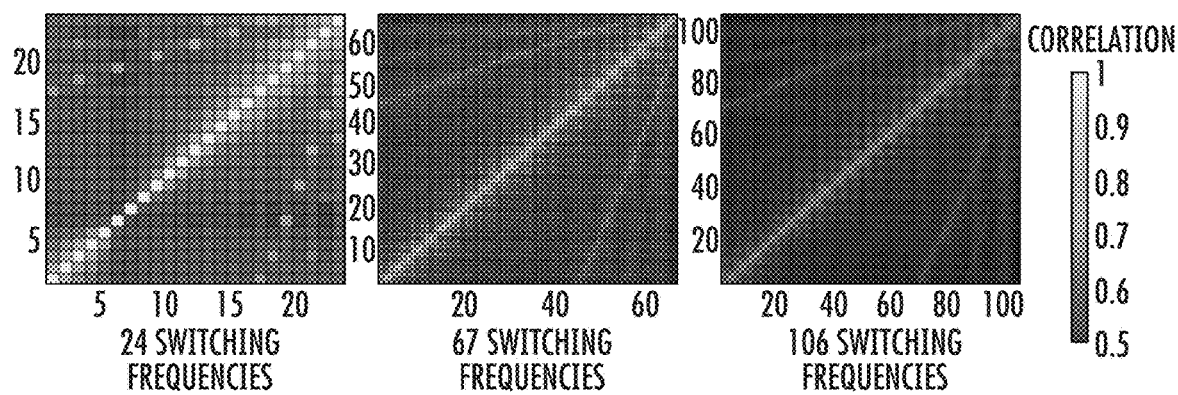
FIG. 7 illustrates a Gram Matrix showing cross correlation between different sinc templates after choosing switching frequencies according to the design criteria in some embodiments according to the invention.

FIG. 7 shows the Gram Matrix illustrating cross correlation between different sinc templates after choosing switching frequencies according to the design criteria. As designed, it is observed that there is high autocorrelation and low cross correlation. Note that the number of tags choosing unique switching frequencies is required only if they are deployed in the same vicinity. Tags far away from each other can still have identical switching frequencies. It is assumed that the modulation frequency of tags are selected at the deployment time based on the number of tags that are present in each zone.

In some embodiments, the retro-directivity feature of the tags allows multiple radars to simultaneously localize a tag with no interference. Closely spaced radars (defined by the number of elements in the Van Atta structure) can still experience some interference. However, the combination of asynchronous operation of radars as well as the chirp structure of the transmitted signal significantly reduces the probability of two radars sending the same frequency at the same time. We evaluate the localization performance in the presence of multiple active hereinbelow.

A system according to embodiments of the present invention was implemented using a commercial mmWave MIMO radar, Analog Devices TinyRad, operating at 24 GHz with 250 MHz of bandwidth and maximum power output of 8 dBm. The radar integrates 4 on-board receiving antennas and 2 transmitting antennas. In this implementation, only one of the transmitting radio chains was used, sending the FMCW chirp over the full 250 MHz of bandwidth, and sampling the received signal at Rx1-Rx4. This configuration provides 2D localization, however, other embodiments according to the invention can be extended to 3D by the use of a 2D MIMO radar. In addition, embodiments according to the invention can be independent of the operating frequency and can be extended to 77 GHz where larger bandwidth is available. The received signal is sampled at 1 MHz and captured using MATLAB, directly polling data from the board.

Figure 9C:
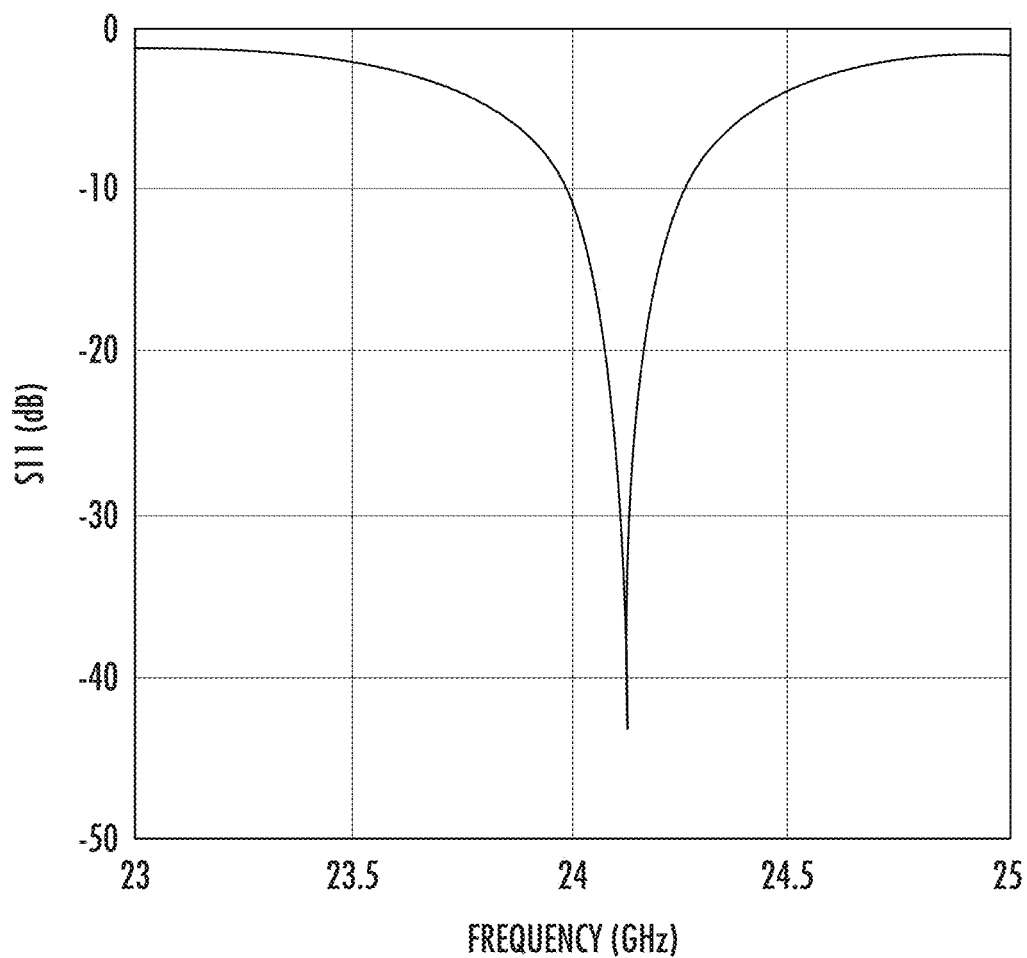

Multiple prototypes of the retroreflective tag were developed, as shown in FIG. 8 using an ADRF5027 RF switch for evaluation kit powered by an ATmega328P microcontroller and 2 off-the-shelf microstrip patch antennas each in a 2×8 array. According to FIG. 8, the antennas are connected to RFC and RF1 ports of the switch, creating a 2-element Van Atta array, while RF2 is terminated with a 50Ω cap for on-off keying modulation. We use this prototype for all evaluations described hereinbelow. The prototype of FIG. 8 further includes a GaAs SPDT RF switch from MACOM atop a Rogers RO4350B substrate that interconnects custom designed antennas using Grounded Coplanar Waveguides (GCPW) and 2.92 connectors. A Texas Instruments MSP430FR5994 microcontroller was used to control the RF switches. FIGS. 9($a$)-($c$) show antenna beam patterns and S11 parameters for the prototype of FIG. 8.

Figure 10C:
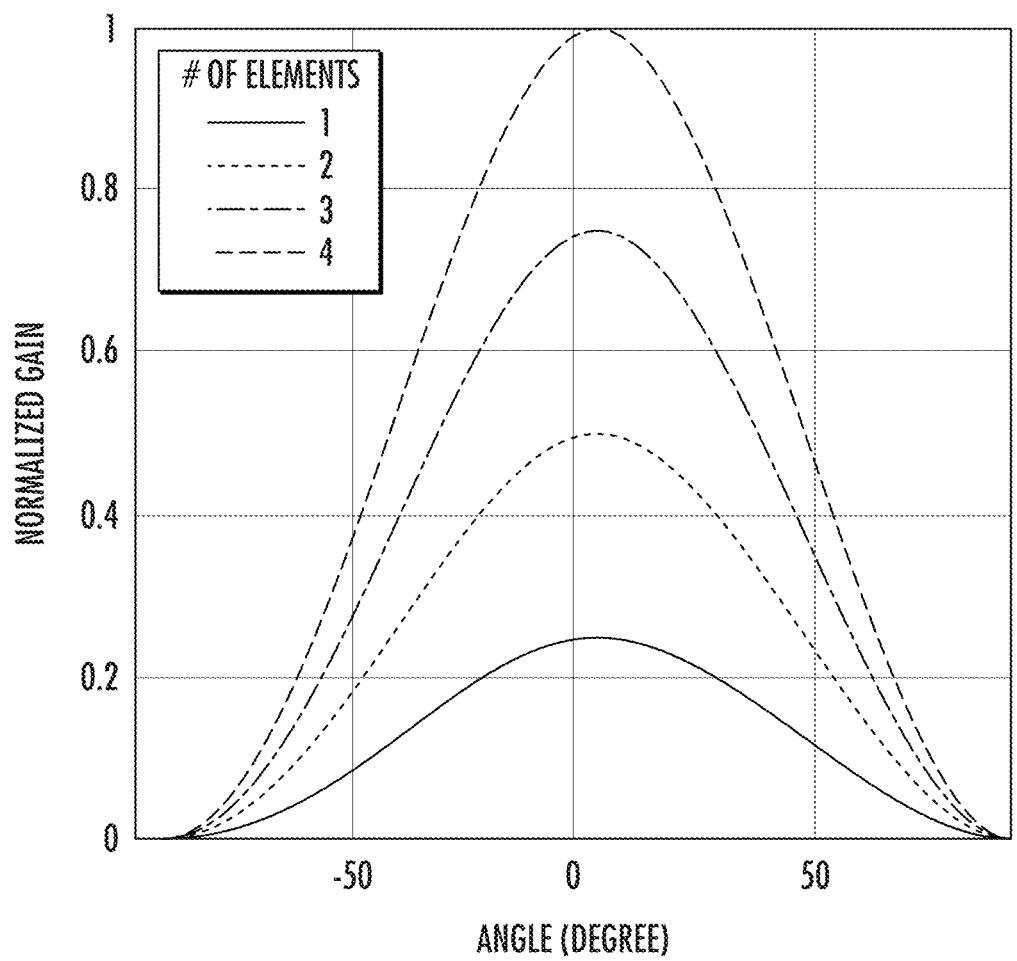

FIGS. 10($a$)-($c$) illustrate a prototypes of the retroreflective tag using an ADRF5027 RF switch and associated phase and gain characteristics in some embodiments according to the invention. FIG. 10$a$ shows an implementation specifically using a 2 element Van Atta array, and another modular design which allows varying sizes of arrays from 1 to 4 elements. Fully integrated versions of the tag may be realized to be slightly bigger than a credit card. Note that the location of the switches within the feed lines is not important due to 50Ω termination of both antennas at the off-state. We select to position the switch at the corner of the transmission line to minimize wide angle turns along the transmission lines. To achieve the desired retro-directivity discussed in Section 4.1, the phases of the corresponding transmission line segments are matched across the antenna pairs. FIG. 10$b$ demonstrates the identical phase at 24.125 GHz using one port reflection coefficient measurements. In addition, FIG. 10$c$ shows the expected re-radiated field for different sizes of Van Atta arrays. As expected, the retro-directive gain increases for larger number of elements proportional to the beampattern defined by the antenna. In Van Atta structures with more than one RF switch, special attention should be given to the RF switch control traces in order to ensure simultaneous activation. As shown in FIG. 10$a$ the length of the differential pairs to interconnect the microcontroller and the RF switch are controlled to ensure the same propagation delay. Designs with 4 or more antenna element pairs will benefit from following a star distribution of the control signals as well as the same trace length.

In evaluating power consumption, one objective was to minimize tag energy consumption. Many high frequency RF switches draw a significant amount of power to maintain linearity, but the MACOM RF switch works across our frequency band with a typical power consumption of less than 1 µA. We pair this with a MSP430FR5994 microcontroller that operates across the entire battery voltage range and hence requires no voltage regulator. A single Timer domain is used to generate a PWM signal and control two output pins by using both edges of the PWM signal. Other types of modulation signals may also be used, By using the specialized timer subsystem, the microcontroller remains in a low-power sleep mode (LPM4) with an internal low-power low-frequency oscillator running and the RF switch maintaining its on or off state. Periodically, the timer subsystem will trigger and automatically change the state of the RF switch. The entire process of changing the state of the RF switch and depleting the internal capacitance of pins and traces takes about 500 ns. Thus, the overall power consumption of the tag is dependent on the number of switch state changes. For a rate of 300, 600, 700, 900, 1100 state changes per second, we measured an averaged power consumption of 2.36, 2.53, 2.61, 2.71 and 2.86 µW, using Keysight N6784A Source Measurement Unit (SMU). If paired with a small form factor CR2032 lithium coin cell (235 mAh) the tag could offer continuous operation for 20.1 to 25.6 years, assuming an efficiency of 75% and no battery self discharge. Alternatively, this amount of power could be supplied by a number of energy harvesting or even atomic sources.

Figure 11A:
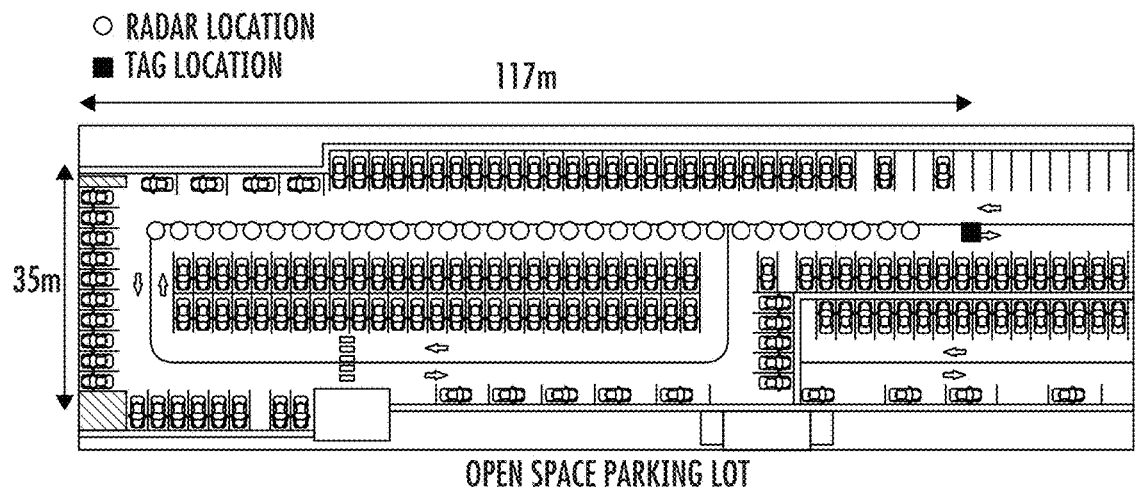
FIG. 11(a)-(d) illustrates various evaluation environments for embodiments of systems according to some embodiments of the present invention.
Figure 11B:
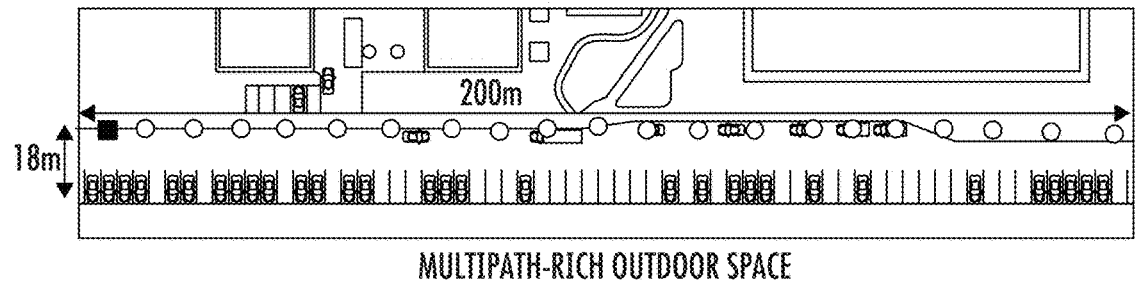
Figures 11C, 11D:
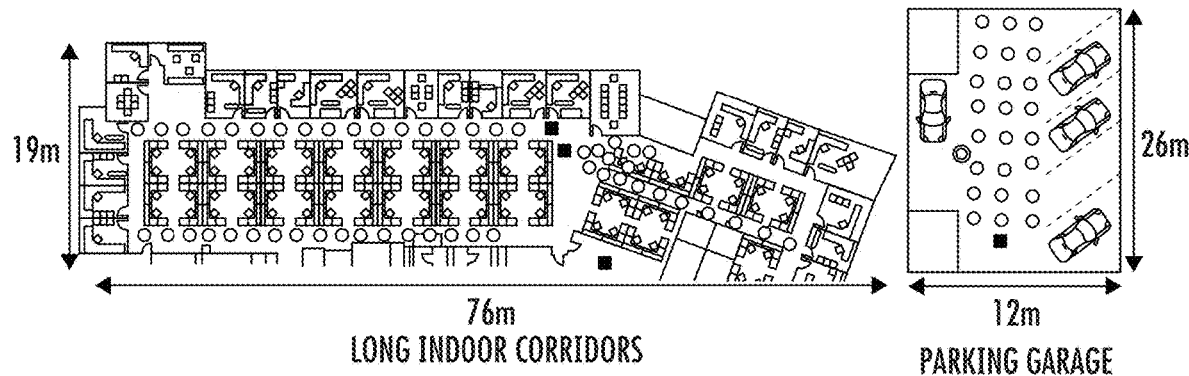
Figure 12:
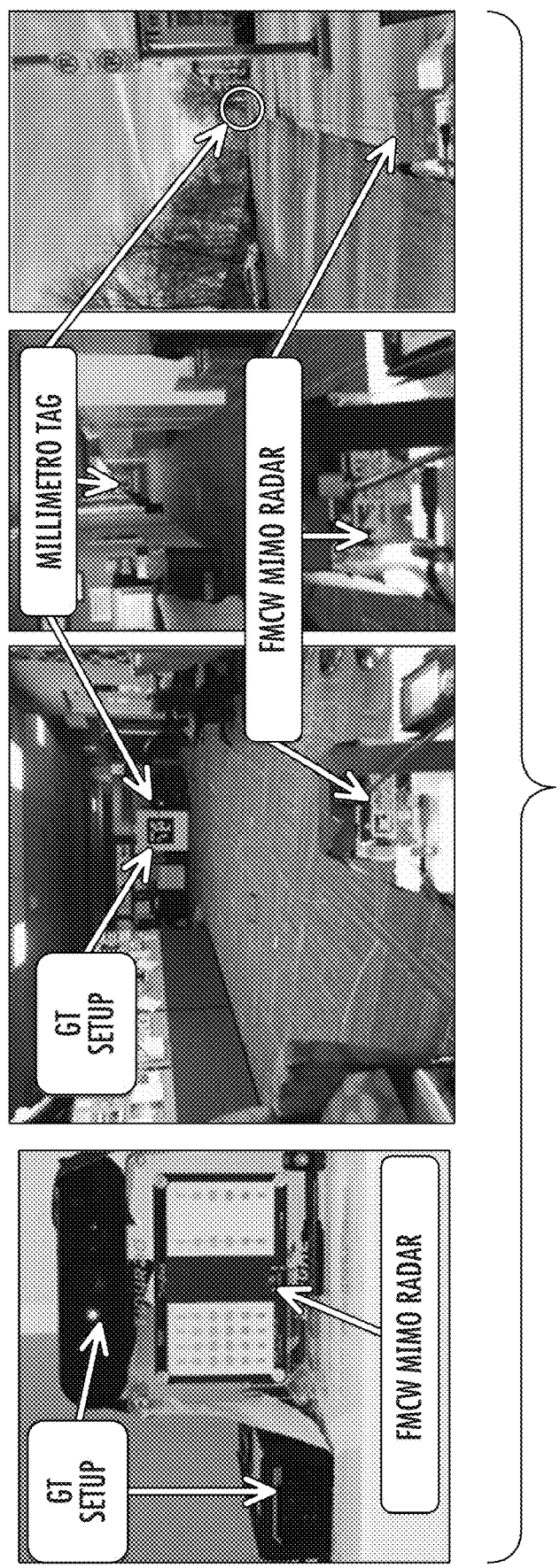
FIG. 12 shows images of the evaluation environments of FIGS. 11(a)-(d) in some embodiments of the present invention.

An evaluation was undertaken in four different environments: (1) an open space parking lot with no cars, (2) a multipath-rich street (3) a roofed parking garage with multiple cars around the tag and radar, (4) an in-door office environment with long corridors, metallic chests, and furniture near both the tag and the radar, representing a multipath-rich indoor environment. The location of the tag and over 150 radar locations are depicted in FIGS. 11($a$)-($d$), with the snapshots of the tag and radar setups in FIG. 12. For the indoor experiments, we set the chirp time duration to 150 us with 256 chirps per frame. This results in a maximum detectable range of 37 m (at a radar with real data). For outdoor experiments, we increased the chirp time duration to 1 ms with 64 chirps per frame to guarantee a maximum detectable range of 300 m. In each experiment 100 frames are collected per test location. For most experiments, we used the 2 element Van Atta structure with a 2×8 patched antenna array at each element.

The baseline for these evaluations was an otherwise identical backscatter tag with a regular scattering antenna as opposed to retro-directive antenna arrays. We isolated other factors by using the same localization and detection algorithm on both systems. To collect the ground truth in shorter ranges (up to 40 m), we used a 60×60 cm Aruco marker and a camera installed on top of the radar, shown in FIG. 11. At extended distances beyond 40 m where the marker does not operate, we used a combination of laser range finder and floor tiles.

Figure 13A:
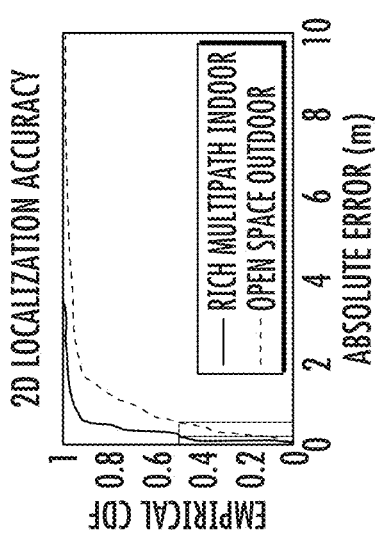
FIGS. 13(a)-(c) are graphs illustrating range accuracy, azimuth accuracy, and localization accuracy respectively in some embodiments according to the invention.
Figure 13B:
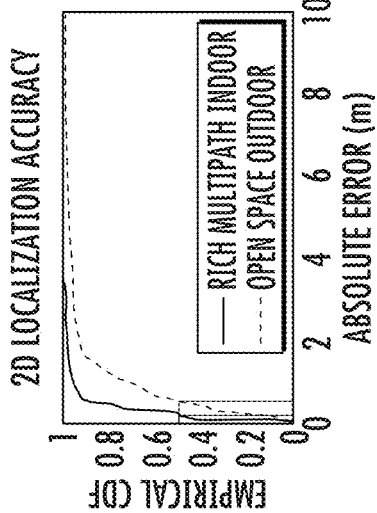

We evaluated the localization accuracy across all the experiments both in multipath-rich indoor and open outdoor spaces. Since the distribution of errors in range and azimuth estimates are different across extended ranges, we started with the performance in estimating each of these two parameters separately. FIGS. 13($a$)-($c$) are graphs illustrating range accuracy, azimuth accuracy, and localization accuracy respectively in some embodiments according to the invention.

Figure 13C:
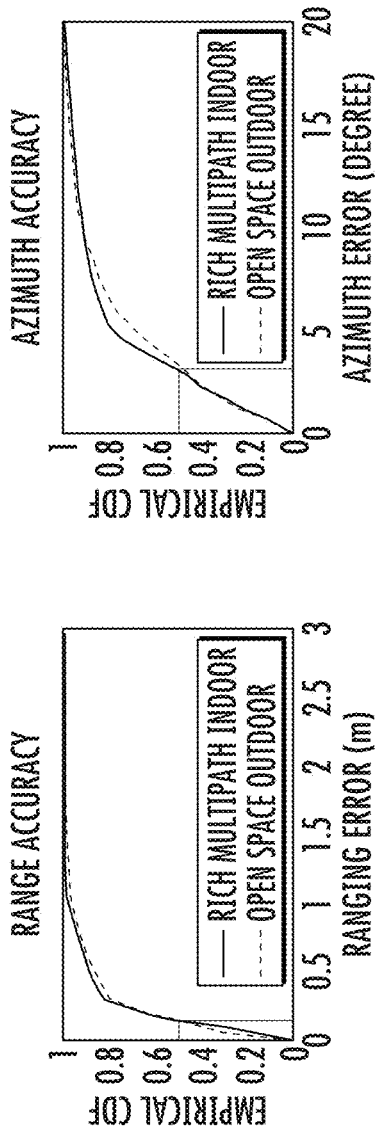

As shown in FIG. 13($a$), the median range error is 15 cm in both indoor and outdoor setups with a 90th percentile of 60 cm. The main difference between indoor and outdoor experiments is at the upper 10th percentile, where results show a longer tail for the indoor experiments. This is mainly caused by multipath propagation, especially in narrow corridors. FIG. 13($b$) presents the azimuth estimation errors. By leveraging the radar's receiving antenna array, the system achieves a median accuracy of 3 degree and a 90th percentile accuracy of 10 degree across both indoor and outdoor experiments. Compared to the nominal azimuth resolution of the commercial radars (approximately 20 degree), the super resolution process enhances the accuracy of the angle estimates to a significant extent. It should be noted that the number of radar's receiving antennas is one of the main factors defining the angular resolution. Therefore, this resolution can be further improved by simply using radars with larger arrays specially in mmWave frequency bands with the small form factor of antennas. Nevertheless, for completeness, we also provide the 2D localization accuracy in both outdoor and indoor experiments in FIG. 13(c), which shows a median accuracy of 22 cm in open space outdoor experiments and 56 cm in multipath-rich indoor spaces. The longtails in this graph are the effect of azimuth errors in longer ranges.

Figure 14A:
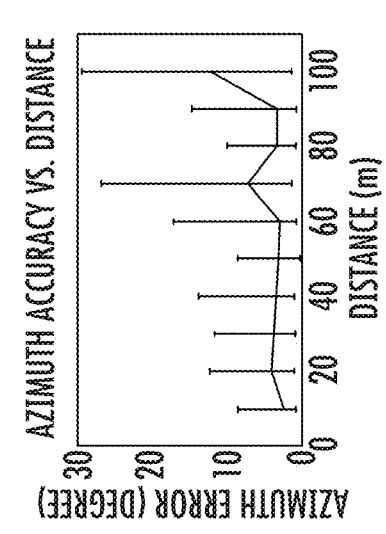
FIG. 14 (a)-(c) are graphs illustrating detection rate, range accuracy, and azimuth accuracy vs. distance for each respectively in some embodiments according to the invention.
Figure 14B:
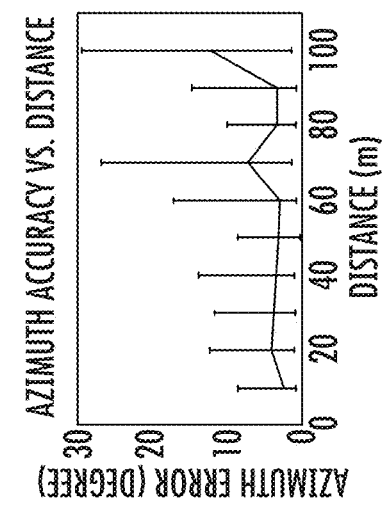
Figure 14C:
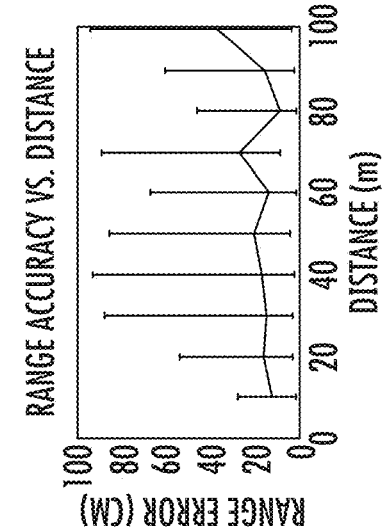

FIGS. 14(a)-(c) are graphs that illustrate detection rate, range accuracy, and azimuth accuracy vs. distance for each respectively in some embodiments according to the invention. To better understand the impact of the system's retro directivity on extending the operating range, we compare it with a baseline method which uses a single antenna instead of a Van Atta structure. We repeated the experiments at open space outdoors and an office space indoors for the baseline at similar test locations shown in FIG. 11. For a fair comparison, we keep all the other parameters the same between these two approaches including the modulation scheme and the localization algorithm.

FIG. 14(a) shows the detection rate compared to this baseline across different distances. We can see that the system maintains an above 90% detection rate up to 100m and gradually degrades to less than 20% at ranges over 200m. This is while the baseline approach significantly suffers at ranges beyond 40 m and drops to 0% detection rate at ranges beyond 100m. This shows the importance of retro-directivity in obtaining long range operation. Other factors affecting the operating range is the size of the Van Atta array as well as the antenna gain at the tag.

FIGS. 14(b) and 14(c) show the median and $10^{th}$ and $90^{th}$ percentile errors of the system as a function of distance from the radar. The figures demonstrate that the system maintains the median range errors at 10-20 cm across different ranges up to 100m and azimuth estimates at 5-10 degrees. However, when moving to longer ranges, both the range and azimuth outlier errors increase, resulting in longer error bars. This is due to the SNR drops at longer ranges, which in turn drops the coding correlation for the tag detection.

Figure 15:
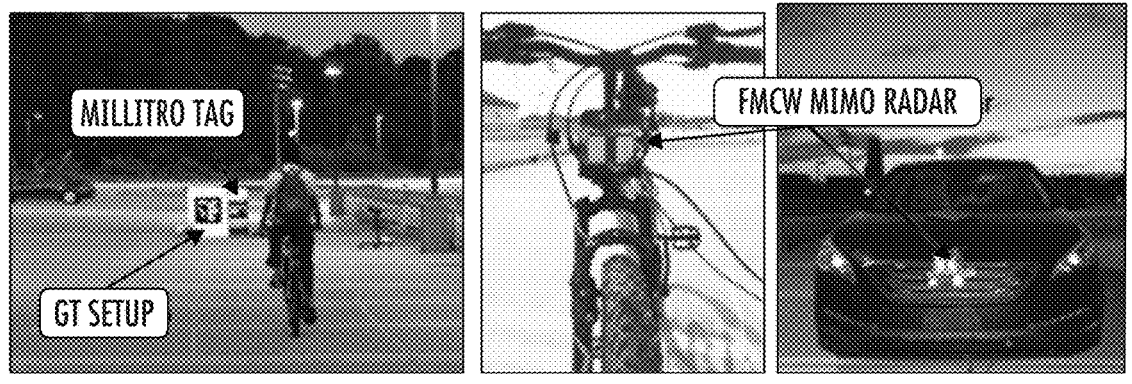
FIG. 15 are images of environments used for mobile performance in some embodiments according to the invention.

We also evaluated embodiments according to the invention performance in mobile scenarios, as a proof of concept for applications such as urban sensing, machine perception in robotics and autonomous driving. We conducted experiments in the open space, where the tag is placed at a fixed location and the radar is placed on a cart, bike, or car. For each of these setups, we performed 2-3 different experiments with different moving speeds (ranging from 3 Km/h to 19 Km/h) and different motion trajectories (i.e. approaching the tag or moving away from the tag). Snapshots of the setup is shown in FIG. 15. To collect the ground truth, we used Aruco marker visual tracking system, which can cover ranges up to 30-40m. Therefore, the results provided in Table 1 below are only at locations that ground truths are available. We can see that the localization accuracy slightly degrades at higher speeds such as driving.

TABLE 1

| Performance under mobility | | | |
|---|---|---|---|
| | walk | bike | drive |
| median 1D Accuracy | 20 cm | 30 cm | 31 cm |
| $90^{th}$ percentile (cm) | 78 cm | 75 cm | 82 cm |

Figure 16A:
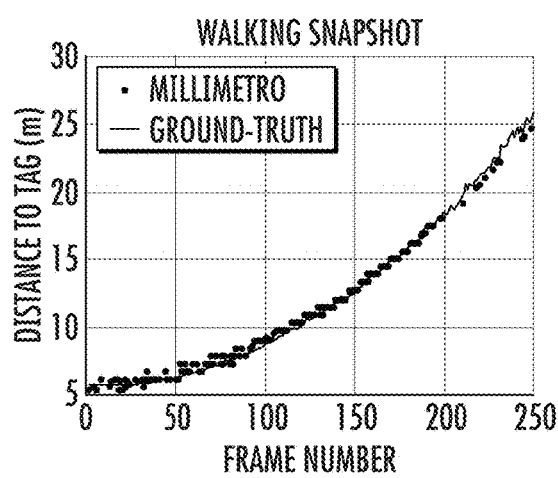
FIGS. 16(a)-(b) are graphs illustrating traces and range estimates for walking and driving experiments in some embodiments according to the invention.
Figure 16B:
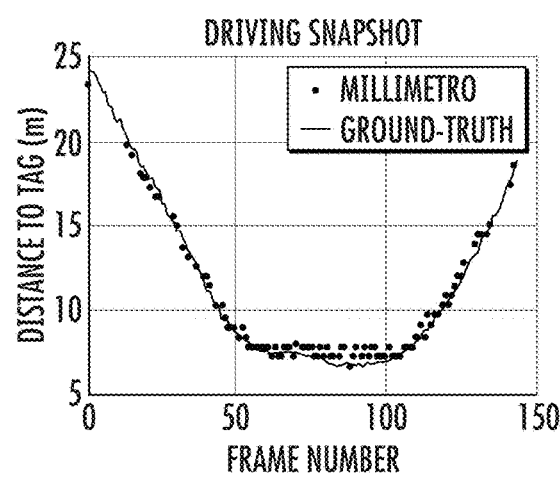

FIGS. 16(a) and 16(b) also depicts snapshots of traces and range estimates for walking and driving experiments, with the ground truth up to the point it was detectable. It is shown that the system maintains high ranging accuracy for extended distances even with mobility, making it a reliable sensing and localization mechanism for autonomous driving and robotic applications. In addition, with the small form-factor of mmWave radars and our retro-reflective tags, systems according to embodiments of the invention may be suitable as a portable localization and sensing approach for other applications such as industrial IoT and augmented reality, by embedding the tags in the environment or even the clothing of pedestrians.

Figure 17A:
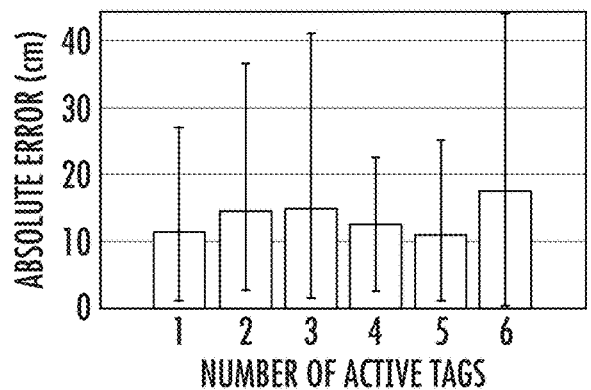
FIGS. 17(a)-(b) illustrate errors vs. the number of tags and the number of radars, respectively in some embodiments according to the invention.
Figure 17B:
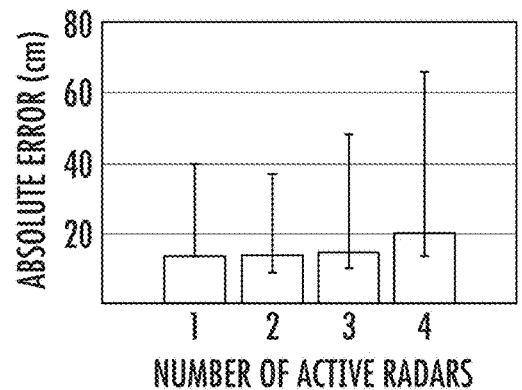
Figure 17C:
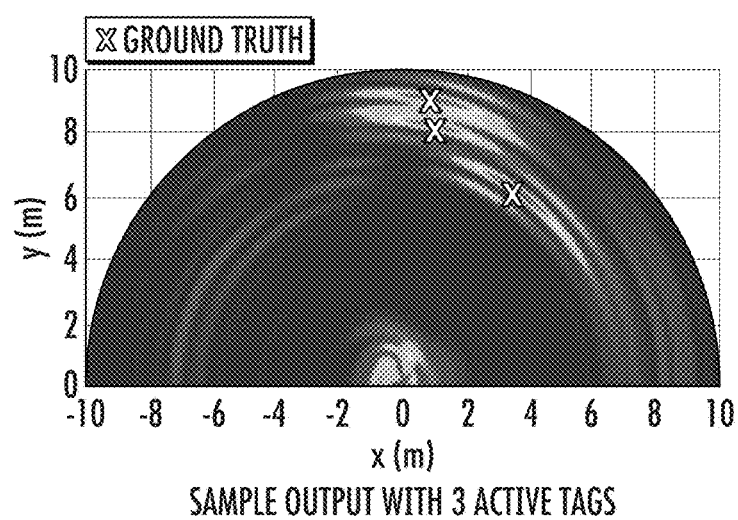
FIG. 17(c) is an image that illustrates a sample output generated in a case using 3 tags in some embodiments according to the invention.

An evaluation of the systems multi tag performance was also performed. FIGS. 17(a)-(b) illustrate errors vs. the number of tags and the number of radars, respectively in some embodiments according to the invention. FIG. 17(c) is an image that illustrates a sample output generated in a case using 3 tags in some embodiments according to the invention. In some embodiments, the localization scheme combined with the asynchronous tag-reader framework allows a radar to localize multiple tags at the same time. We evaluated this by placing six different tags in a small indoor space and locating them from different ranges from the radar. The distance between tags was changed from 50 cm to 1.5 m while the average distance of the radar to the tags varied between 3 m to 15 m, for a total of 50 experiments. During each experiment, all of the active tags were constantly modulating, each at a certain frequency from the proposed coding scheme. For simplicity, we focus on range estimates and Localization. As shown in FIG. 17(a), the average ranging accuracy slightly decreases from 11 cm to 17 cm when 6 tags are active. According to FIGS. 17(a)-(c) a majority of errors happen for the tags that are co-located and having very similar modulation frequencies, resulting in confusion in the match filter correlations. This can be addressed at the time of tag deployment by selecting well-separated modulation frequencies for co-located tags.

In addition to simultaneous reading of multiple tags, the tag retro-directivity as well as the adopted asynchronous tag-reader architecture enables concurrent multi-reader operation, where multiple radars can scan the same set of tags in their field of view at the same time. We evaluate the performance in this scenario by running over 20 experiments in different locations of the indoor office in ranges from 2 m to 17 m from the tag. We also varied the number of active radars from 1 to 4 without running any synchronization protocol between them. To stress test the system, two of the radars were always co-located and are only 20 cm apart on a table. We also repeated each experiment 5 times in each of which the radars are initiated in a random order. For the simplicity of ground-truth measurements, we focus on range estimates only. As shown in FIG. 17(b), the median range estimate errors increase from 10 cm in the presence of one active radar to 20 cm with 4 active radars. Performance degradation may be attributed to the increase in multi-path interference between co-located radars. However, in real-world applications, there is typically a sufficient distance between radars to avoid such interference. Nevertheless, even with four concurrent active radars, the system is shown to be capable of detecting and locating tags.

Figure 18A:
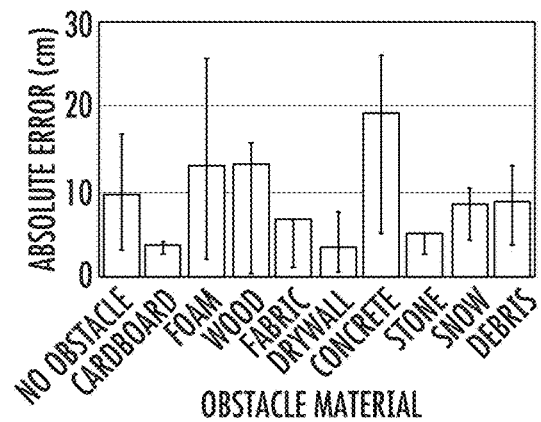
FIG. 18(a) is a graph illustrating error for a range of materials and tag positions in some embodiments according to the invention.
Figure 18B:
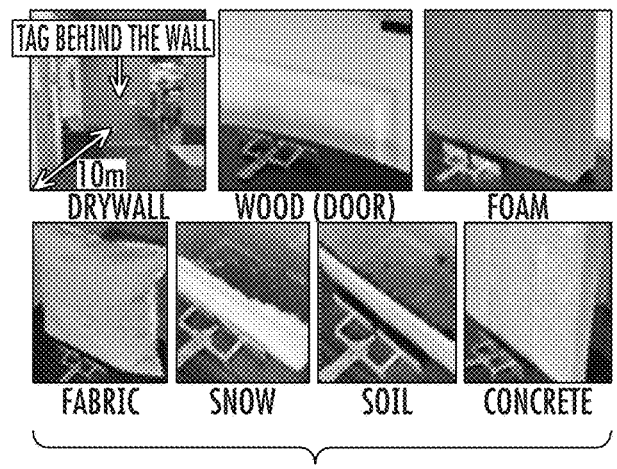
FIG. 18(b) is a graph illustrating error for a range of materials and tag positions in some embodiments according to the invention.

We also evaluated tag localization performance in Non-Line-of-Sight (NLoS) scenarios. mmWave signals can be significantly attenuated by certain obstacles such as humans or a metal object, but it is expected to be capable of detecting tags even if other kinds of obstructions present, such as in common to robotic and autonomous driving scenarios where the tag is enclosed, behind a wall, or covered with snow or debris. We therefore evaluated the localization performance of the systems while penetrating through different materials, as shown in FIG. 18(b). In our evaluations, we place the tag and radar at different ranges from 4 m to 20 m for a total of over 50 experiments. We then blocked the tag to radar view by placing large sheets of different materials with varying thicknesses and ensuring that line-of-sight view is completely obstructed. We also tested the penetration of the tag retro-reflection through one or multiple drywalls as well as snow and debris. FIG. 18(a) demonstrates the median localization errors across different materials. We can see that the ranging accuracy slightly decreases in the presence of an obstacle with a larger error for thicker and denser obstacles such as concrete or wood. However, the tag is still detectable even when going through multiple layers of dry wall and at ranges above 15 m.

Figures 19A, 19B:
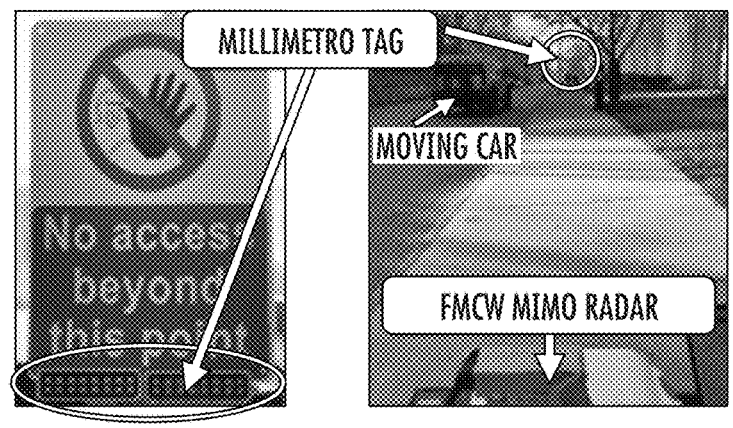
FIGS. 19(a)-(b) are images showing tags and readers attached on a metal surface and on a moving car, respectively in some embodiments according to the invention.

We also evaluated the sensitivity of the system to strong multipath signals such as the reflections from the road sign itself or varying multipath signals such as reflections from other moving cars on the road or people moving in the environment. We conducted several experiments to evaluate the multipath effect. First, we test the impact of strong reflections from nearby objects by placing the tag on a road sign as shown in FIGS. 19(a) and (b), near a car, or metal shelves in indoor environments. We notice no degradation in the tag localization performance. This is mainly because the system looks for changes in the channel measurements in a frame to detect the tag. Therefore, it can resolve the dynamic range problem through background subtraction techniques by using the first chirp in a frame as the reference point. Next, we performed an experiment with a fixed distance of 10 between the tag and the reader and have 1 or 2 people moving in and around the line-of-sight between the tag and the reader. We performed a total of 5 experiments, in each case collecting over 300 frames. The five experiments included 1 or 2 persons continuously crossing the LoS, 1 or 2 persons walking on the sides of the LoS link, and one person walking across the line in a zigzag motion. Across these experiments, negligible impact on the localization performance was noted. This is due to the way that the system detects the tag reflection by using the sinc template instead of solely relying on the modulation frequency. The frequency range of Doppler shift and tag modulation are quite separated. In addition, even for very highspeed moving cars in the environment, the tag modulation still carries a unique signature as a sinc function while the Doppler shift is a single frequency component. The system uses this approach to differentiate the tag reflection from other varying multipath signals such as other moving cars in the environment. Some experiments showed the tag detection rate reduced from 100% to 84%. This corresponds to the periods that all users are in the LoS completely blocking the tag to reader view. However, such missed detections can be easily handled by integrating measurements across multiple frames in more crowded areas.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the various embodiments described herein. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so.

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, various embodiments described herein may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wired, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages, such as a programming language for a FPGA, Verilog, System Verilog, Hardware Description language (HDL), and VHDL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

The term "about" generally refers to a range of numeric values that one of skill in the art would consider equivalent to the recited numeric value or having the same function or result. For example, "about" may refer to a range that is within ±1%, ±2%, ±5%, ±7%, ±10%, ±15%, or even ±20% of the indicated value, depending upon the numeric values that one of skill in the art would consider equivalent to the recited numeric value or having the same function or result. Furthermore, in some embodiments, a numeric value modified by the term "about" may also include a numeric value that is "exactly" the recited numeric value. In addition, any numeric value presented without modification will be appreciated to include numeric values "about" the recited numeric value, as well as include "exactly" the recited numeric value. Similarly, the term "substantially" means largely, but not wholly, the same form, manner or degree and the particular element will have a range of configurations as a person of ordinary skill in the art would consider as having the same function or result. When a particular element is expressed as an approximation by use of the term "substantially," it will be understood that the particular element forms another embodiment.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

What is claimed:
1. A method of operating a frequency modulated continuous-wave (FMCW) radar, the method comprising:
   transmitting a plurality of first signals from a plurality of antennas of the FMCW radar, wherein each of the plurality of first signals comprises a continuous wave with a frequency that linearly varies over time across a defined bandwidth and duration;
   receiving, via the plurality of antennas, a plurality of second signals that include asynchronously modulated retro-directive responses, each asynchronously modulated retro-directive response being generated by at least one remote radio frequency tag located remotely from the FMCW radar, wherein each asynchronously modulated retro-directive response is produced by retro-directively reflecting a respective first signal of the plurality of first signals back toward the FMCW radar in an asynchronously modulated form;
   generating difference Intermediate Frequency signals by comparing the plurality of first signals and the plurality of second signals; and
   performing a first transform operation on the difference Intermediate Frequency signals to detect and identify a presence of the asynchronously modulated retro-directive responses in the difference Intermediate Frequency signals, wherein the FMCW radar is configured to localize the at least one remote radio frequency tag based on the asynchronously modulated retro-directive responses.

2. The method of claim 1, wherein performing the first transform operation on the difference Intermediate Frequency signals generates a range map data indicating a range from the radar for the asynchronously modulated retro-directive responses detected in the difference Intermediate Frequency signals.

3. The method of claim 2, further comprising:
performing a second transform operation on the range map data to provide a range-Doppler map data indicating multipath reflected signals included in the range map data.

4. The method of claim 3, further comprising filtering the range-Doppler map data using a sinc function to differentiate the multipath reflected signals from the asynchronously modulated retro-directive responses.

5. The method of claim 3 further comprising performing a third transform operation on range-Doppler map data corresponding to the second signals to provide range-angle map data including azimuth data for the at least one remote radio frequency tag.

6. The method of claim 1, wherein the asynchronously modulated retro-directive responses are asynchronously modulated with a square wave at the remote radio frequency tag to generate the asynchronously modulated retro-directive responses included in the plurality of second signals received from the remote radio frequency tag.

7. The method of claim 1, further comprising, after transmitting the plurality of first signals from the plurality of antennas of the FMCW radar:
receiving the plurality of first CHIRP signals at a retro-directive antenna array of the at least one remote radio frequency tag;
modulating the plurality of first CHIRP signals asynchronously relative to a time a which the plurality of first signals were transmitted from the FMCW radar to generate the second signals; and
transmitting the plurality of second signals, comprising the asynchronously modulated retro-directive responses, from the at least one remote radio frequency tag back toward the FMCW radar.

8. The method of claim 4, wherein filtering the range-Doppler map data comprises applying a transformation based on a periodic square wave corresponding to a modulation frequency of each asynchronously modulated retro-directive response in the plurality of second signals, with the transformation representing a frequency-domain operation derived from the periodic square wave sampled in alignment with a repetition frequency of the plurality of first signals.

9. The method of claim 4, wherein filtering the range-Doppler map data comprises applying a transformation based on a periodic square wave corresponding to a modulation pattern of each asynchronously modulated retro-directive response in the plurality of second signals, combined with a factor compensating for Doppler shifts due to relative velocity between the at least one remote radio frequency tag and the FMCW radar.

10. The method of claim 5, further comprising processing the range-angle map data to refine the azimuth data by applying a transformation to samples of the plurality of first signals, wherein the transformation is based on a combination of complex amplitudes and time delays corresponding to at least one remote radio frequency tag, the time delays being defined by a slope of each of the plurality of first signals and a sampling frequency associated with the FMCW radar.

11. The method of claim 10, wherein the plurality of first signals are received via the plurality of antennas, and a time delay associated with the at least one remote radio frequency tag is determined based on the range map data and azimuth data of the at least one remote radio frequency tag, a spacing between the plurality of antennas, and the speed of light.

* * * * *